US 11,794,324 B2

(12) United States Patent
Yoshikane et al.

(10) Patent No.: US 11,794,324 B2
(45) Date of Patent: Oct. 24, 2023

(54) DUST COLLECTING SYSTEM

(71) Applicant: MAKITA CORPORATION, Anjo (JP)

(72) Inventors: Kiyonobu Yoshikane, Anjo (JP);
Yoshitaka Machida, Anjo (JP); Hitoshi Iida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 556 days.

(21) Appl. No.: 16/830,375

(22) Filed: Mar. 26, 2020

(65) Prior Publication Data

US 2020/0306945 A1    Oct. 1, 2020

(30) Foreign Application Priority Data

Mar. 26, 2019    (JP) .................. 2019-059374

(51) Int. Cl.
*B25D 11/00*    (2006.01)
*B25D 16/00*    (2006.01)
(Continued)

(52) U.S. Cl.
CPC ........ *B25D 11/005* (2013.01); *B23Q 11/0046* (2013.01); *B23Q 11/0071* (2013.01);
(Continued)

(58) Field of Classification Search
CPC .................. B25D 11/005; B25D 16/00; B25D 2216/0023; B25D 2217/0057; B25D 2250/095; B25Q 11/0046
(Continued)

(56) References Cited

U.S. PATENT DOCUMENTS 6,124,698 A * 9/2000 Sakakibara ....... H02J 7/007194
                                                        320/160
8,915,309 B2 * 12/2014 Kakiuchi ........... B23Q 11/0046
                                                        173/171
(Continued)

FOREIGN PATENT DOCUMENTS

JP    S62-236673 A    10/1987
JP    2018-058188 A    4/2018
(Continued)

OTHER PUBLICATIONS

Aug. 9, 2022 Office Action issued in Japanese Patent Application No. 2019-059374.

*Primary Examiner* — Thanh K Truong
*Assistant Examiner* — David G Shutty
(74) *Attorney, Agent, or Firm* — Oliff PLC

(57) ABSTRACT

A dust collecting system includes a power tool and a dust collector. The power tool includes at least one battery-mounting part, a first motor, a driving mechanism and a body housing. The at least one battery-mounting part is each configured to removably receive a battery. The first motor is configured to operate with electric power supplied from the battery. The driving mechanism is configured to drive the tool accessory by power of the first motor. The body housing houses the first motor and the driving mechanism. The dust collecting system includes a control device configured to control operation of at least one of the power tool and the dust collector according to a state of the whole dust collecting system.

7 Claims, 16 Drawing Sheets

(51) Int. Cl.
*B25D 17/20* (2006.01)
*B23Q 11/00* (2006.01)

(52) U.S. Cl.
CPC .............. *B25D 16/00* (2013.01); *B25D 17/20* (2013.01); *B25D 2216/0023* (2013.01); *B25D 2217/0057* (2013.01); *B25D 2250/095* (2013.01); *B25D 2250/221* (2013.01)

(58) Field of Classification Search
USPC .......................................................... 408/67
See application file for complete search history.

(56) References Cited

U.S. PATENT DOCUMENTS

| | | | |
|---|---|---|---|
| 11,020,846 B2* | 6/2021 | Kawano | B25D 17/00 |
| 11,338,425 B2* | 5/2022 | Hartmann | B25D 17/20 |
| 2013/0136549 A1* | 5/2013 | Appel | B23Q 11/0046 408/56 |
| 2015/0328764 A1* | 11/2015 | Yoshikane | B25D 16/00 173/104 |
| 2016/0311094 A1* | 10/2016 | Mergener | H02J 7/0024 |
| 2017/0173775 A1* | 6/2017 | Ullrich | B23B 47/34 |
| 2017/0232565 A1* | 8/2017 | Machida | B25F 5/00 173/198 |
| 2018/0099391 A1 | 4/2018 | Umemoto et al. | |
| 2019/0070721 A1 | 3/2019 | Kawano et al. | |
| 2019/0101422 A1* | 4/2019 | Koenigbauer | B23Q 11/0071 |
| 2019/0126456 A1* | 5/2019 | Abbott | B25F 5/001 |
| 2022/0105616 A1* | 4/2022 | Wirnitzer | B25D 11/005 |

FOREIGN PATENT DOCUMENTS

| | | |
|---|---|---|
| JP | 2018-069397 A | 5/2018 |
| JP | 2022-516966 A | 3/2022 |
| WO | 2017/145643 A1 | 8/2017 |

* cited by examiner

DUST COLLECTING SYSTEM

CROSS-REFERENCE TO RELATED APPLICATION

The present application claims priority to Japanese patent application No. 2019-59374 filed on Mar. 26, 2019, contents of which are fully incorporated herein by reference.

TECHNICAL FIELD

The present disclosure relates to a dust collecting system that includes a power tool and a dust collector.

BACKGROUND ART

A dust collecting system is known which includes a power tool configured to perform processing operation on a workpiece by driving a tool accessory and a dust collector configured to be attached to the power tool to collect dust generated by the processing operation (see, for example, Japanese non-examined laid-open patent publication No. 2018-58188).

SUMMARY

The present disclosure provides a dust collecting system which includes a power tool and a dust collector. The power tool is configured to perform processing operation on a workpiece by driving a tool accessory. The dust collector is configured to be removably attached to the power tool and to collect dust generated by the processing operation. The power tool includes at least one battery-mounting part, a first motor, a driving mechanism and a body housing. The at least one battery-mounting part is each configured to removably receive a battery. The first motor is configured to operate with electric power supplied from the battery. The driving mechanism is configured to drive the tool accessory by power of the first motor. The body housing houses the first motor and the driving mechanism. Further, the dust collecting system includes a control device configured to control operation of at least one of the power tool and the dust collector according to a state of the whole dust collecting system. The control device may be provided in the power tool or in the dust collector. The control device may include one control circuit or a plurality of control circuits. In the latter case, at least one of the control circuits may be provided in the power tool and at least another one of the control circuits may be provided in the dust collector.

DETAILED DESCRIPTION OF THE EMBODIMENTS

Some embodiments are described below with reference to the drawings.

First Embodiment

Figure 1:
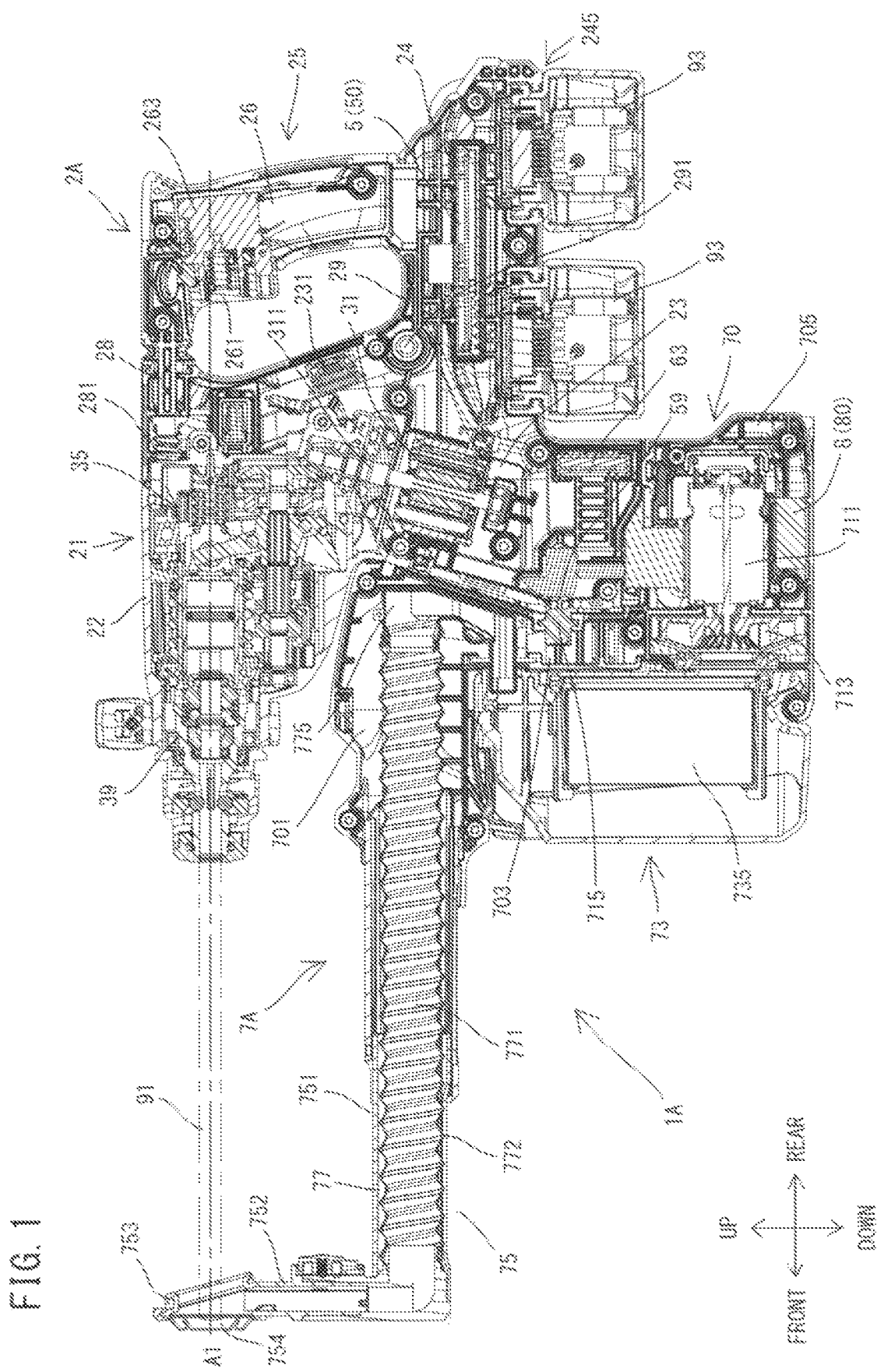
FIG. 1 is a sectional view showing a dust collecting system according to a first embodiment.

A dust collecting system 1A according to a first embodiment is now described with reference to FIGS. 1 to 6. As shown in FIG. 1, the dust collecting system 1A of the present embodiment includes a hammer drill 2A and a dust collector 7A. The hammer drill 2A is configured to perform processing operation (such as chipping operation and drilling operation) by driving a removably coupled tool accessory 91 by power of a driving motor 31. More specifically, the hammer drill 2A is configured to perform hammering motion of linearly driving the tool accessory 91 along a driving axis A1 and drilling motion of rotationally driving the tool accessory 91 around the driving axis A1. The chipping operation is performed by the hammering motion, and the drilling operation is performed by the drilling motion. Further, the dust collector 7A is configured to be removably attached to the hammer drill 2A, and to collect dust generated by the processing operation.

First, the general structure of the hammer drill 2A is described with reference to FIG. 1.

As shown in FIG. 1, an outer shell of the hammer drill 2A is mainly formed by a body housing 21 and a handle 25. The body housing 21 includes a driving-mechanism-housing part 22 which houses a driving mechanism 35, a motor-housing part 23 which houses the driving motor 31, and a controller-housing part 24 which houses a controller 5. The body housing 21 is generally Z-shaped in a side view as a whole.

The driving-mechanism-housing part 22 is formed as an elongate box-like body and extends along the driving axis A1. A tool holder 39, to which the tool accessory 91 can be removably coupled, is disposed within one end portion of the driving-mechanism-housing part 22 in a driving-axis-A1 direction. The motor-housing part 23 is formed as an elongate box-like body and protrudes in a direction away from the driving axis A1 from the other end portion of the driving-mechanism-housing part 22 in the driving-axis-A1 direction. The driving motor 31 is disposed within the motor-housing part 23 such that a rotation axis of a motor shaft 311 extends in a direction which intersects the driving axis A1 (specifically, in a direction which is oblique to the driving axis A1).

In the following description, for convenience sake, an axial direction of the driving axis A1 (also referred to as the driving-axis-A1 direction) is defined as a front-rear direction of the hammer drill 2A. In the front-rear direction, the one end side on which the tool holder 39 is provided is defined as a front side (also referred to as a front-end-region side) of the hammer drill 2A, while its opposite side is defined as a rear side. Further, a direction which is orthogonal to the driving axis A1 and which corresponds to an axial direction of the rotation axis of the motor shaft 311 is defined as an up-down direction of the hammer drill 2A. In the up-down direction, a direction toward which the motor-housing part 23 protrudes is defined as a downward direction, while its opposite direction is defined as an upward direction. Furthermore, a direction which is orthogonal to the front-rear direction and the up-down direction is defined as a left-right direction.

The controller-housing part 24 is a rectangular box-like portion of the body housing 21 which extends rearward from a generally central portion (where a body of the driving motor 31 is housed) of the motor-housing part 23 in the up-down direction. A controller 5 is housed in the controller-housing part 24. In the present embodiment, two battery-mounting parts 245, to which batteries (also referred to as battery packs) 93 can be removably mounted, are provided side by side in the front-rear direction on a lower end portion (on the lower side of the controller 5) of the controller-housing part 24. In the present embodiment, the hammer drill 2A and the dust collector 7A are configured to operate with electric power which is supplied from the battery 93.

The handle 25 is generally C-shaped in a side view as a whole. Both ends of the handle 25 are connected to a rear end portion of the body housing 21. The handle 25 includes a grip part 26 to be held by a user. The grip part 26 is arranged apart rearward from the body housing 21 and extends generally in the up-down direction, crossing the driving axis A1. A trigger 261 is provided on a front side of an upper end portion of the grip part 26. The trigger 261 is configured to be depressed by a user.

The detailed physical structure of the hammer drill 2A is now described.

First, the body housing 21 and its internal structure are described.

As shown in FIG. 1, the driving mechanism 35 is housed in the driving-mechanism-housing part 22. The driving mechanism 35 is configured to drive the tool accessory 91 by power of the driving motor 31. In the present embodiment, the driving mechanism 35 includes a motion-converting mechanism, a striking mechanism and a rotation-transmitting mechanism. The motion-converting mechanism is configured to convert rotation of the motor shaft 311 into linear motion and transmit it to the striking mechanism. In the present embodiment, the motion-converting mechanism is of a type using a swinging member. The striking mechanism is configured to linearly operate to strike the tool accessory 91, thus linearly driving the tool accessory 91 along the driving axis A1. In the present embodiment, the striking mechanism includes a striker and an impact bolt. The rotation-transmitting mechanism is configured to decelerate rotation of the motor shaft 311 and then transmit it to the tool holder 39, thus rotationally driving the tool accessory 91. The rotation-transmitting mechanism includes a plurality of gears. An operation mode (a hammer drill mode, a drill mode and a hammer mode) of the hammer drill 2A may be switched by a mode-switching mechanism (not shown). The mode-switching mechanism may appropriately interrupt power transmission in the motion-converting mechanism or in the rotation-transmitting mechanism, according to a user's operation of a mode-switching dial (not shown). The structures of the driving mechanism 35 and the mode-switching mechanism are known and therefore not described in detail.

As described above, the motor-housing part 23 is connected to a rear end portion of the driving-mechanism-housing part 22 and extends downward. The driving motor 31 is housed in an upper portion of the motor-housing part 23. In the present embodiment, a direct current (DC) brushless motor is adopted as the driving motor 31. The driving motor 31 includes a motor body, which includes a stator and a rotor, and a motor shaft 311, which extends from the rotor and rotates together with the rotor. The rotation axis of the motor shaft 311 extends obliquely downward and forward relative to the driving axis A1.

A speed-change-dial unit 231 is housed in a rear upper end portion of the motor-housing part 23. Although not shown in detail, the speed-change-dial unit 231 includes a dial which can be turned from the outside of the motor-housing part 23 by a user, and a variable resistor mounted on a circuit board. The dial is an operation member which may be operated by the user to set the rotation speed of the driving motor 31. The variable resistor outputs a resistance value corresponding to the turning position of the dial. The speed-change-dial unit 231 is connected to the controller 5 via a wiring (not shown) and configured to output to the controller 5 a signal which indicates a resistance value (i.e. set rotation speed) corresponding to the turning operation of the dial.

An acceleration sensor unit 63 is supported in a lower rear portion (on the lower side of the driving motor 31) of the motor-housing part 23. Although not shown in detail, the acceleration sensor unit 63 includes a case, a board housed in the case and an acceleration sensor 631 (see FIG. 2) mounted on the board. In the present embodiment, the acceleration sensor 631 detects acceleration as an index value (physical quantity) which indicates a rotation state of the body housing 21 around the driving axis A1. In the present embodiment, the acceleration sensor unit 63 is disposed right below the driving axis A1 within a lower end portion of the motor-housing part 23 which is away from the driving axis A1. In this position, rotation of the body housing 21 around the driving axis A1 can be recognized (detected) as movement in the left-right direction. Therefore, the acceleration sensor 631 is configured to detect acceleration at least in the left-right direction. In the present embodiment, as the acceleration sensor 611, a triaxial acceleration sensor is adopted which is capable of detecting acceleration in three directions, which is the front-rear, left-right and up-down directions. The acceleration sensor 631 is configured to output a signal corresponding to the detected acceleration (hereinafter referred to as an acceleration signal) to the controller 5 via a wiring (not shown). In the present embodiment, the acceleration signal is used to determine whether excessive rotation occurs (the possibility of occurrence of kickback) due to occurrence of a locked state of the tool accessory, which will be described below in detail.

Further, a recess for fixing the dust collector 7A is provided in a front end portion of the lower portion of the motor-housing part 23. A connector 59 is disposed in this recess and configured to be electrically connected to a connector 715 of the dust collector 7A.

The controller 5 is housed in the controller-housing part 24. Although not shown in detail, the controller 5 includes a case, a board housed in the case and a control circuit 50 (see FIG. 2) mounted on the board. In the present embodiment, the controller 5 is configured to control driving of the driving motor 31 based on an operation state of the trigger 261 and the rotation state of the body housing 21 around the driving axis A1, which will be described below in detail.

As describe above, the two battery-mounting parts 245 are provided on the lower end portion of the controller-housing part 24, so that two batteries 93 can be mounted to the hammer drill 2A. The hammer drill 2A is operable with only one battery 93 or with two batteries 93 mounted thereto. The hammer drill 2A is generally used with two batteries 93 mounted thereto, but can also be used with only one battery mounted thereto (at lower voltage), for example, in order to prolong the usable time (life) (so-called runtime) of the two batteries 93. Further, a battery 93 selected from various types of batteries 93 which is different, for example, in voltage or capacity, from that shown in FIG. 1 may also be mounted to the battery-mounting part 245.

Each of the battery-mounting parts 245 has an engagement structure (not shown) for sliding engagement with the battery 93 and a terminal part 246 (see FIG. 2) which can be electrically connected to the battery 93 when the battery 93 is engaged. The structures of the battery-mounting part 245 and the battery 93 themselves are well-known and therefore described briefly here. The terminal part 246 has a power terminal and a communication terminal. When the battery 93 is mounted to the battery-mounting part 245, the power terminal and the communication terminal are connected to a power terminal and a communication terminal of the battery 93, respectively. Power is supplied from the battery 93 to the hammer drill 2A by connection of the power terminals. Further, a signal indicating the type of the battery 93 (hereinafter referred to as a battery signal) is inputted from the battery 93 to the controller 5 via the terminal part 246 by connection of the communication terminals.

Next, the handle 25 and its internal structure are described.

As shown in FIG. 1, the handle 25 includes the grip part 26, an upper connection part 28 and a lower connection part 29. As described above, the grip part 26 is arranged to extend in the up-down direction, and the trigger 261 is provided on the front side of the upper end portion of the grip part 26. The grip part 26 has an elongate cylindrical shape and houses a switch 263 inside. The switch 263 is normally kept in an OFF state and turned ON in response to an operation of depressing the trigger 261. The switch 263 is thus configured to detect depressing and releasing of the trigger 261. Further, the switch 263 is connected to the controller 5 (specifically, the control circuit 50) via a wiring (not shown), and outputs a signal corresponding to the operation amount of the trigger 261 (hereinafter referred to as a trigger signal) to the controller 5 when the switch 263 is in the ON state. The upper connection part 28 extends forward from an upper end portion of the grip part 26 and is connected to an upper rear end portion of the body housing 21. The lower connection part 29 extends forward from a lower end portion of the grip part 26 and is connected to a central portion of the rear end portion of the body housing 21. Further, the lower connection part 29 is disposed on the upper side of the controller-housing part 24.

In the present embodiment, the handle 25 is elastically connected to the body housing 21 so as to be movable relative to the body housing 21. More specifically, an elastic member 281 is disposed between a front end portion of the upper connection part 28 and a rear end portion of the driving-mechanism-housing part 22. The lower connection part 29 is pivotably supported by the motor-housing part 23 via a support shaft 291 extending in the left-right direction. By provision of such a structure, transmission of vibration from the body housing 21 to the handle 25 (the grip part 26) can be suppressed.

Next, the dust collector 7A is described. The dust collector 7A is used in a state where the dust collector 7A is attached to the hammer drill 2A. Therefore, in the following description, for convenience sake, directions of the dust collector 7A are defined corresponding to the directions of the hammer drill 2A with the dust collector 7A attached thereto.

First, the general structure of the dust collector 7A is described. As shown in FIG. 1, the dust collector 7A includes a body housing 70, a dust case 73, a sliding part 75 and a dust-transfer passage 77. The body housing 70 is configured to be removably attached to the body housing 21 of the hammer drill 2A. The body housing 70 houses a dust-collection motor 711 and a fan 713. The fan 713 is configured to be rotationally driven by the dust-collection motor 711 to generate air flow for collecting dust. The dust case 73 is a container for storing dust. The dust case 73 is removably mounted to the body housing 70. The sliding part 75 is held by the body housing 70 so as to be slidable in the front-rear direction. Further, the sliding part 75 has a cover part 753. The cover part 753 has a suction port 754 for sucking dust and is configured to cover a tip of the tool accessory 91. The dust-transfer passage 77 is a passage through which dust sucked from the suction port 754 is transferred. The dust-transfer passage 77 extends through the inside of the sliding part 75 and is connected to the dust case 73.

When the dust-collection motor 711 is driven and the fan 713 is rotated, dust generated by the processing operation is sucked in through the suction port 754 together with air and led into the dust case 73 through the dust-transfer passage 77. In the dust case 73, only the dust is separated from the air by a filter 735 and stored. The air from which the dust has been separated is discharged from an outlet (not shown) formed in the body housing 70. Thus, in the dust collecting system 1A, the dust collector 7A collects the dust generated by the processing operation using the hammer drill 2A.

The detailed structure of the dust collector 7A is now described.

As shown in FIG. 1, the body housing 70 is a hollow body which is generally Z-shaped in a side view. The body housing 70 includes a sliding-guide part 701, a connector part 703 and a motor-housing part 705.

The sliding-guide part 701 is a rectangular box-like portion forming an upper end portion of the body housing 70. The sliding-guide part 701 has an internal space extending in the front-rear direction. An opening is provided at a front end of the sliding-guide part 701 to provide communication between the internal space and the outside. A structure for holding the sliding part 75 such that the sliding part 75 is slidable in the front-rear direction is provided in the inside of the sliding-guide part 701, which is a well-known structure and therefore is not described in detail and not shown in the drawings.

The connector part 703 is provided on the lower side of a rear end portion of the sliding-guide part 701 and extends in the up-down direction. A rear wall of the connector part 703 has a protruding portion protruding rearward. The connector 715 is provided in this protruding portion to be electrically connected to the connector 59 of the hammer drill 2A.

The motor-housing part 705 is a rectangular box-like portion provided on the lower side of the connector part 703 and extending rearward of the connector part 703, and forms a lower end portion of the body housing 70. A pair of guide rails, which extend in the front-rear direction, are respectively formed on upper ends of left and right sides of the motor-housing part 705. Correspondingly, a pair of guide grooves, which extend in the front-rear direction, are respectively provided in lower end portions of left and right sides of the motor-housing part 23 of the hammer drill 2A. The guide rails and the guide grooves have well-known structures and therefore are not described in detail here and not shown in the drawings. The dust collector 7A can be attached to the body housing 21 of the hammer drill 2A via slide engagement between the guide rails and the guide grooves. Further, a dust collector 7A of a different type (different, for example, in the size of the body housing 70 or the length of the sliding part 75) from the dust collector 7A shown in FIG. 1 may be attached to the hammer drill 2A. When the dust collector 7A is attached to the body housing 21, the protruding portion of the connector 703 is fitted in the recess of the motor-housing part 23 and the connector 715 is electrically connected to the connector 59.

A structure for such connection via the connectors 715 and 59 is well known and therefore described briefly here. The connectors 59 and 715 each have a power terminal and a communication terminal. When the dust collector 7A is attached to the hammer drill 2A, the power terminal and the communication terminal of the connector 715 are connected to the power terminal and the communication terminal of the connector 59, respectively. By connection of the power terminals, electric power is supplied from the battery 93 to the dust collector 7A via the connectors 59 and 715. Further, by connection of the communication terminals, a signal indicating a type of the dust collector 7A (hereinafter referred to as a dust-collector signal) is inputted from a controller 8 of the dust collector 7A to the controller 5 via the connectors 715 and 59.

The motor-housing part 705 houses the dust-collection motor 711, the fan 713 and the controller 8. More specifically, the dust-collection motor 711 is arranged such that its motor shaft extends in the front-rear direction. In the present embodiment, a motor with a brush is adopted as the dust-collection motor 711. The fan 713 is fixed to the motor shaft in front of a motor body (a stator and a rotor) of the dust-collection motor 711 and rotates together with the motor shaft. The fan 713 is a centrifugal fan. An opening is formed in a front wall of the motor-housing part 705 so as to face a suction area of the fan 713. Although not shown in detail, the controller 8 includes a case, a board housed in the case and a control circuit 80 (see FIG. 2) mounted on the board. When the dust collector 7A is attached to the body housing 21 as described above, the controller 8 is connected to the controller 5 of the hammer drill 2A via the connectors 715 and 59. In the present embodiment, the controller 8 is configured to control driving of the dust-collection motor 711 based on the operation state of the trigger 261, which will be described below in detail.

As shown in FIG. 1, the dust case 73 is a rectangular box-like container. The dust case 73 has an inlet, through which dust-containing air flows in, and an outlet, through which air from which dust has been separated, flows out. The outlet communicates with the opening of the motor-housing part 705 which is formed in front of the fan 713. The filter 735 is disposed within the dust case 73. The air which has passed through the filter 735 flows out of the dust case 73 into the motor-housing part 705 via the outlet and is discharged to the outside of the dust collector 7A from a discharge outlet (not shown).

As shown in FIG. 1, the sliding part 75 is a tubular member which is generally L-shaped in a side view as a whole. The sliding part 75 includes a first tubular part 751 linearly extending in the front-rear direction and a second tubular part 752 extending upward from a front end portion of the first tubular part 751. The cover part 753 is provided on an upper end of the second tubular part 752 and configured to cover the tip of the tool accessory 91. The suction port 754 extends through the cover part 753 in the front-rear direction. The sliding part 75 is held by the body housing 70 such that a portion of the first tubular part 751 is always located within the sliding-guide part 701 while the second tubular part 752 (including the cover part 753) protrudes forward from the sliding-guide part 701.

As shown in FIG. 1, the dust-transfer passage 77 extends through the inside of the sliding part 75 and connects the suction port 754 and the inlet of the dust case 73. The dust sucked in from the suction port 754 is transferred to the dust case 73 through the dust-transfer passage 77. In the present embodiment, the dust-transfer passage 77 is defined by a portion (the second tubular part 752) of the sliding part 75, a hose 771 and a hose-connecting part 775. The hose 771 is formed in a bellows shape to be extensible. One end of the hose 771 is connected to a lower end portion of the second tubular part 752. The other end of the hose 771 protrudes rearward from a rear end of the sliding part 75 and is connected to one end portion of the hose-connecting part 775. The other end portion of the hose-connecting part 775 is inserted into the dust case 73 through the inlet. With this structure, the dust-transfer passage 77 is formed to connect the suction port 754 and the dust case 73.

Further, a spring 772 is fitted on the hose 771. In the present embodiment, a compression coil spring is adopted as the spring 772. The sliding part 75 is always biased forward, that is, in a direction to protrude from the body housing 70, by the elastic force of the spring 772. Therefore, the sliding part 75 is held in an initial position (shown in FIG. 1) while no external force is applied rearward to the sliding part 75 (hereinafter also referred to as an initial state). When the processing operation (such as the drilling operation) is performed with the tip of the tool accessory 91 and the cover part 753 pressed against a workpiece, the sliding part 75 is pushed into the inside of the body housing 70 against the biasing force of the spring 772, as the processing operation proceeds. When the processing operation is completed and the pressing operation is released, the sliding part 75 returns to the initial position by the elastic force of the spring 772.

Figure 2:
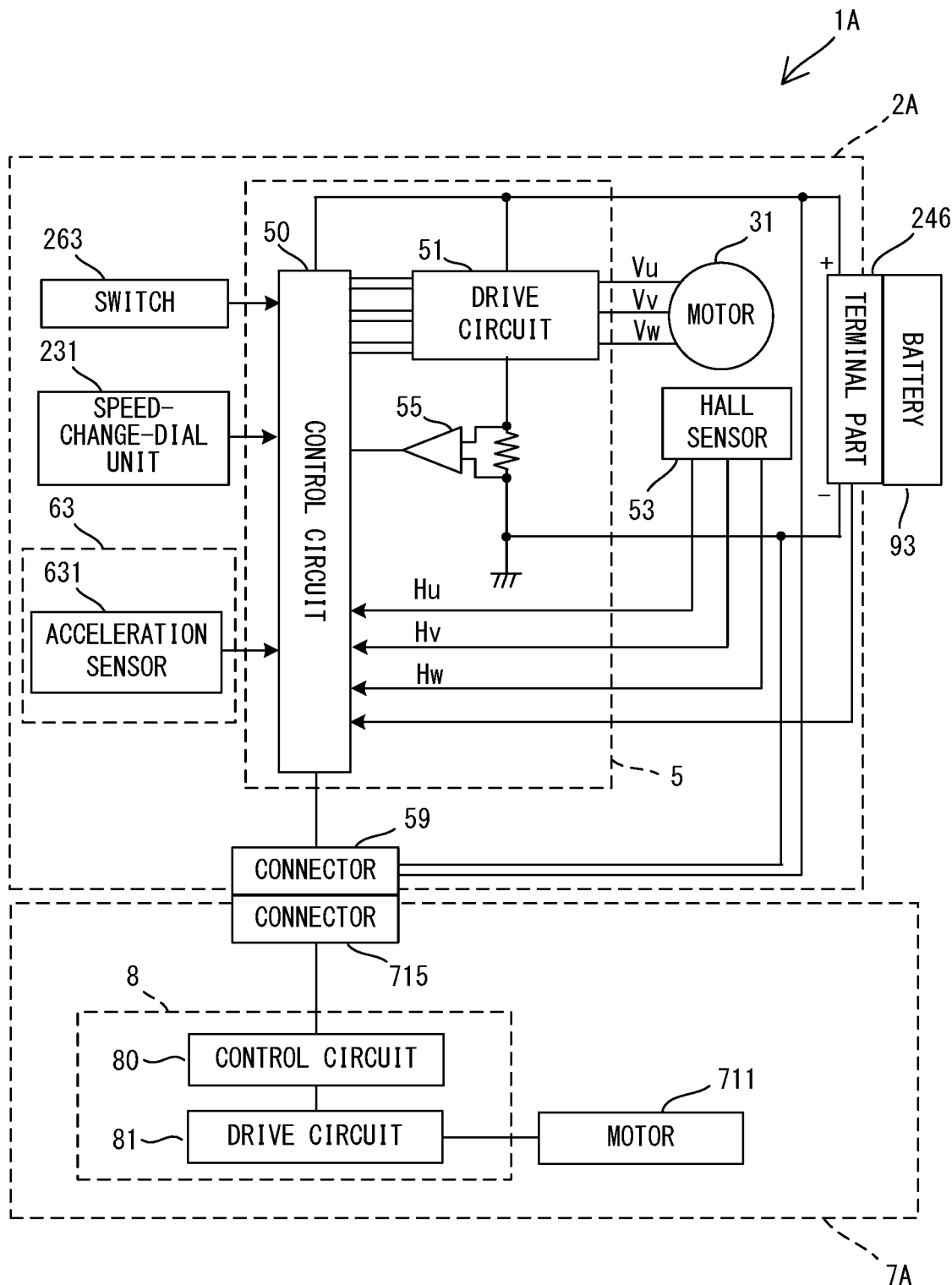
FIG. 2 is a block diagram showing the electrical configuration of the dust collecting system.

The electrical configurations of the hammer drill 2A and the dust collector 7A are now described with reference to FIG. 2.

The hammer drill 2A has the control circuit 50, a drive circuit 51 and a current-detecting amplifier 55 which are mounted on the board of the controller 5. Further, a Hall sensor 53, the switch 263, the speed-change-dial unit 231, the acceleration sensor 631, the terminal part 246 and the connector 59 are electrically connected to the control circuit 50.

In the present embodiment, the control circuit 50 is formed by a microcomputer including a CPU, a ROM, a RAM and a timer. The drive circuit 51 includes a three-phase bridge circuit using six semiconductor switching elements. The current-detecting amplifier 55 converts current flowing through the driving motor 31 into voltage by shunt resistance and further outputs a signal amplified by the amplifier to the control circuit 50. The Hall sensor 53 has three Hall elements which are arranged corresponding to respective phases of the driving motor 31, and outputs a signal indicating a rotation position of the rotor to the control circuit 50. As described above, the switch 263 outputs to the control circuit 50 a trigger signal corresponding to the operation amount of the trigger 261 in response to the operation of depressing the trigger 261. The speed-change-dial unit 231 outputs to the control circuit 50 a signal corresponding to the rotation speed set via a turning operation of the dial. The acceleration sensor 631 outputs an acceleration signal corresponding to the detected acceleration to the control circuit 50. The terminal part 246 outputs a battery signal inputted from the battery 93 to the control circuit 50.

The control circuit 50 starts or stops driving of the driving motor 31 based on various kinds of signals inputted from the Hall sensor 53, the current-detecting amplifier 55, the switch 263, the speed-change-dial unit 231, the acceleration sensor unit 63, the terminal part 246 and the like. Further, the control circuit 50 appropriately sets the rotation speed of the driving motor 31 and then sets a drive duty ratio of each of the switching elements according to the rotation speed and outputs a control signal corresponding to the set drive duty ratio to the drive circuit 51. In this manner, the control circuit 50 controls driving of the driving motor 31.

The dust collector 7A has the control circuit 80 and a drive circuit 81 which are mounted on the board of the controller 8. Further, the connector 715 is electrically connected to the control circuit 80. In the present embodiment, like the control circuit 50, the control circuit 80 is formed by a microcomputer including a CPU, a ROM, a RAM and a timer. The drive circuit 81 has a switching element.

As described above, when the dust collector 7A is attached to the body housing 21, the control circuit 80 is electrically connected to the control circuit 50 of the hammer drill 2A via the connectors 715 and 59. Accordingly, the control circuit 80 outputs a dust-collector signal indicating the type of the dust collector 7A to the control circuit 50. The type of the dust collector may be stored in advance, for example, in the ROM of the control circuit 50. The control circuit 50 outputs at least a trigger signal from the switch 263 and a weight signal, which will be described below, to the control circuit 80, while the control circuit 50 is connected to the control circuit 80. The control circuit 80 starts and stops driving of the dust-collection motor 711 by switching on and off the switching element of the drive circuit 81. Further, the control circuit 80 appropriately sets the rotation speed of the dust-collection motor 711 and supplies current according to the set rotation speed to the switching element. In this manner, the control circuit 80 controls driving of the dust-collection motor 711.

Operation control in the dust collecting system 1A is now described. In the present embodiment, driving of the driving motor 31 of the hammer drill 2A is controlled by the control circuit 50 of the hammer drill 2A, while driving of the dust-collection motor 711 of the dust collector 7A is separately controlled by the control circuit 80 of the dust collector 7A.

Figure 3:
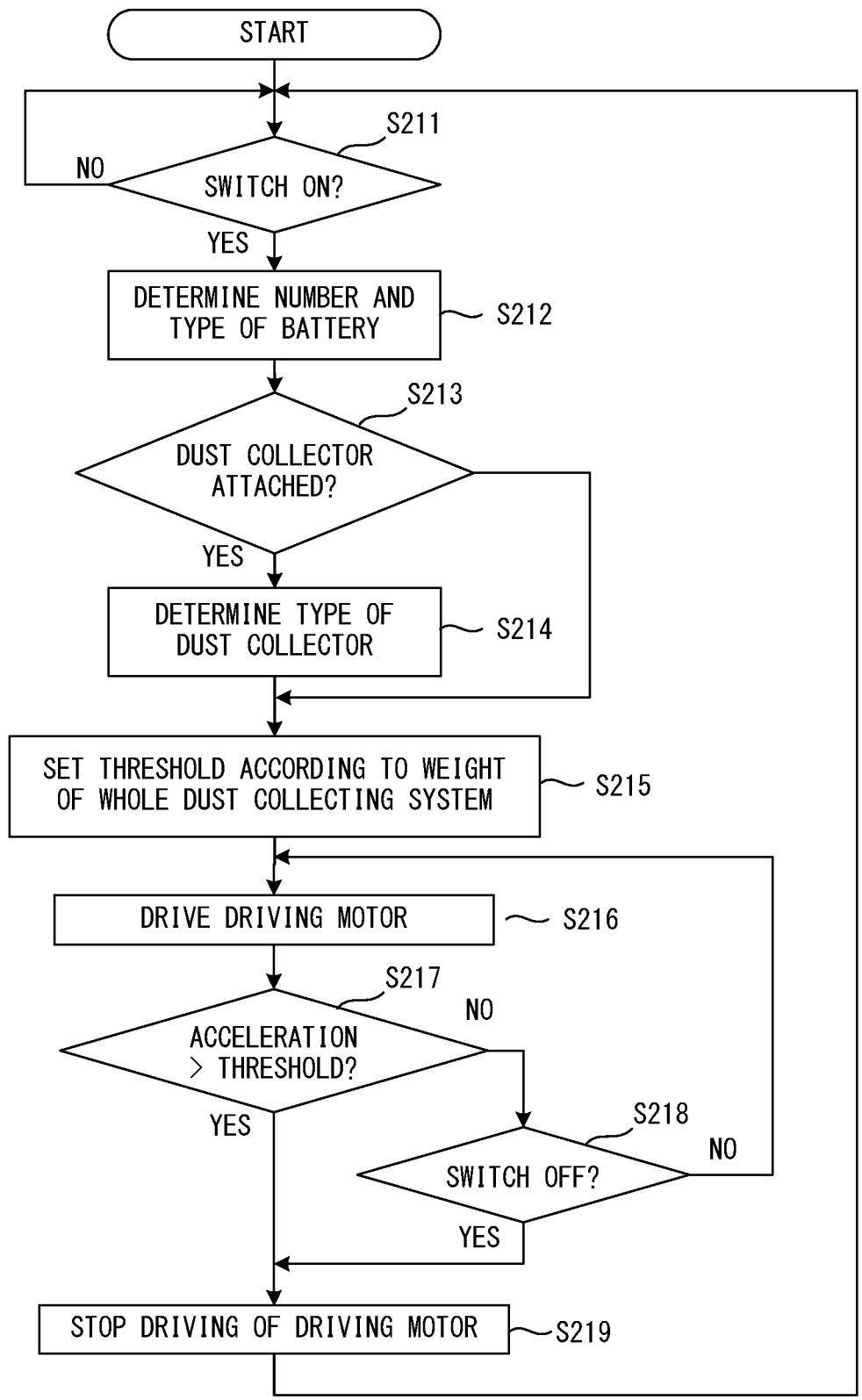
FIG. 3 is a flowchart showing drive control processing of a driving motor.

First, drive control processing of the driving motor 31 which is performed by the control circuit 50 (specifically, CPU) of the hammer drill 2A is described in detail, with reference to FIG. 3. The drive control processing of the driving motor 31 is started when power supply to the hammer drill 2A is started by the battery 93 being mounted to the battery-mounting part 245. The drive control processing of the driving motor 31 is terminated when the power supply is stopped. In the following description and drawings, each "step" in the processing is simply expressed as "S".

As shown in FIG. 3, the control circuit 50 first monitors a trigger signal and waits until the trigger 261 is depressed and the switch 263 is turned on (S211: NO, S211). In a case where the switch 263 is turned on (S211: YES), the control circuit 50 determines the number and the type of the mounted batteries 93 based on a battery signal (S212). As described above, only one battery 93 may be mounted, or two batteries 93 may be mounted to the two battery-mounting parts 245. When two batteries 93 are mounted, the type of each battery 93 is determined in S212.

Subsequently, the control circuit 50 determines whether or not the dust collector 7A is attached, based on whether or not a dust-collector signal is inputted (S213). In a case where the dust collector 7A is attached (S213: YES), the control circuit 50 determines the type of the dust collector 7A based on the dust-collector signal (S214). In a case where the dust collector 7A is not attached (S213: NO), the control circuit 50 proceeds to S215.

The control circuit 50 sets a threshold, which is to be used to determine whether or not excessive rotation occurs (the possibility of occurrence of kickback) due to occurrence of a locked state of the tool accessory 91, according to the weight of the whole dust collecting system 1A (S215).

More specifically, the control circuit 50 determines the weight of the whole dust collecting system 1A based on the number and the type of the battery 93 which are determined in S212 and the type of the dust collector 7A which is determined in S214. The weight of the battery 93 varies depending on the type (particularly, capacity), and the weight of the dust collector 7A varies depending on the type. Therefore, the weight of the whole dust collecting system 1A can be determined based on the number and the type of the batteries 93, whether the dust collector 7A is attached or not, and the type of the dust collector 7A. Further, the correspondence between the capacity and the weight of the battery 93, the correspondence between the type and the weight of the dust collector 7A, and the weight of the hammer drill 2A are stored in advance, for example, in the ROM of the control circuit 50. The control circuit 50 can determine the weight of the whole dust collecting system 1A with reference to these information. Further, the control circuit 50 outputs to the control circuit 80 of the dust collector 7A a signal corresponding to the determined weight of the whole dust collecting system 1A (hereinafter referred to as a weight signal).

Further, in the present embodiment, the control circuit 50 sets a threshold based on a predetermined correspondence between the weight of the whole dust collecting system 1A and the threshold. Information defining the correspondence (hereinafter referred to as correspondence information) may be stored in advance, for example, in the ROM of the control circuit 50.

Figure 4:
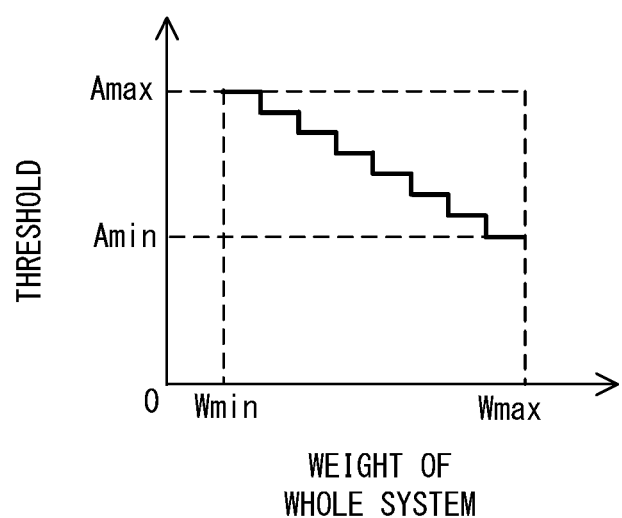
FIG. 4 is a graph schematically showing an example of a correspondence between the weight of the whole dust collecting system and a threshold of acceleration.

FIG. 4 schematically shows an example of the correspondence information which can be adopted in the present embodiment. In this example, it is defined that the threshold decreases stepwise from a maximum value Amax to a minimum value Amin as the overall weight increases from a minimum weight Wmin to a maximum weight Wmax. This correspondence is defined by taking into consideration that when the tool accessory 91 is locked, the dust collecting system 1A having a smaller overall weight may more easily rotate around the driving axis A1, while the dust collecting system 1A having a larger overall weight may less easily rotate around the driving axis A1. In order to prepare this correspondence information, the weight of the whole dust collecting system 1A may be determined for each combination of each of plural kinds of batteries 93 which can be mounted to the hammer drill 2A and each of plural kinds of dust collectors 7A which can be mounted to the hammer drill 2A. Then, optimal threshold for each combination may be determined based on actual measurements. The correspondence information shown in FIG. 4 is illustrative only and the correspondence information is not limited to this example.

As shown in FIG. 3, after setting the threshold, the control circuit 50 drives the driving motor 31 (S216). The control circuit 50 may drive the driving motor 31 at constant rotation speed, but in the present embodiment, drives the driving motor 31 at rotation speed set according to the operation amount (percentage) of the trigger 261. Specifically, the rotation speed set with the speed-change-dial unit 231 is used as a rotation speed (i.e. maximum rotation speed) to be set according to the maximum operation amount of the trigger 261. Then, the control circuit 50 calculates the rotation speed of the driving motor 31 based on the maximum rotation speed and the actual operation amount (percentage) of the trigger 261 which is indicated by the trigger signal, and drives the driving motor 31 at the calculated rotation speed.

The control circuit 50 determines acceleration in the left-right direction which indicates the rotation state of the body housing 21 around the driving axis A1, based on the latest acceleration signal outputted from the acceleration sensor 631, and determines whether or not the determined acceleration exceeds the threshold set in S215 (S217). In a case where the acceleration exceeds the threshold (S217: YES), the control circuit 50 stops driving of the tool accessory 91 by stopping driving of the driving motor 31 (S219) and returns to S211. In a case where the acceleration does not exceed the threshold (S217: NO), the control circuit 50 determines whether or not the switch 263 is turned off, based on the trigger signal (S218). In a case where the switch 263 is not turned off (S218: NO), the control circuit 50 continues driving of the driving motor 31 at the rotation speed set according to the operation amount of the trigger 261 (S216). In a case where the switch 263 is turned off (S218: YES), the control circuit 50 stops driving of the driving motor 31 (S219) and returns to S211.

Next, drive control processing of the dust-collection motor 711 which is performed by the control circuit 80 (specifically, CPU) of the dust collector 7A is described in detail. The drive control processing of the dust-collection motor 711 is started when power supply to the dust collector 7A is started via the hammer drill 2A by the battery 93 being mounted to the battery-mounting part 245. The drive control processing of the dust-collection motor 711 is terminated when power supply is stopped.

Figure 5:
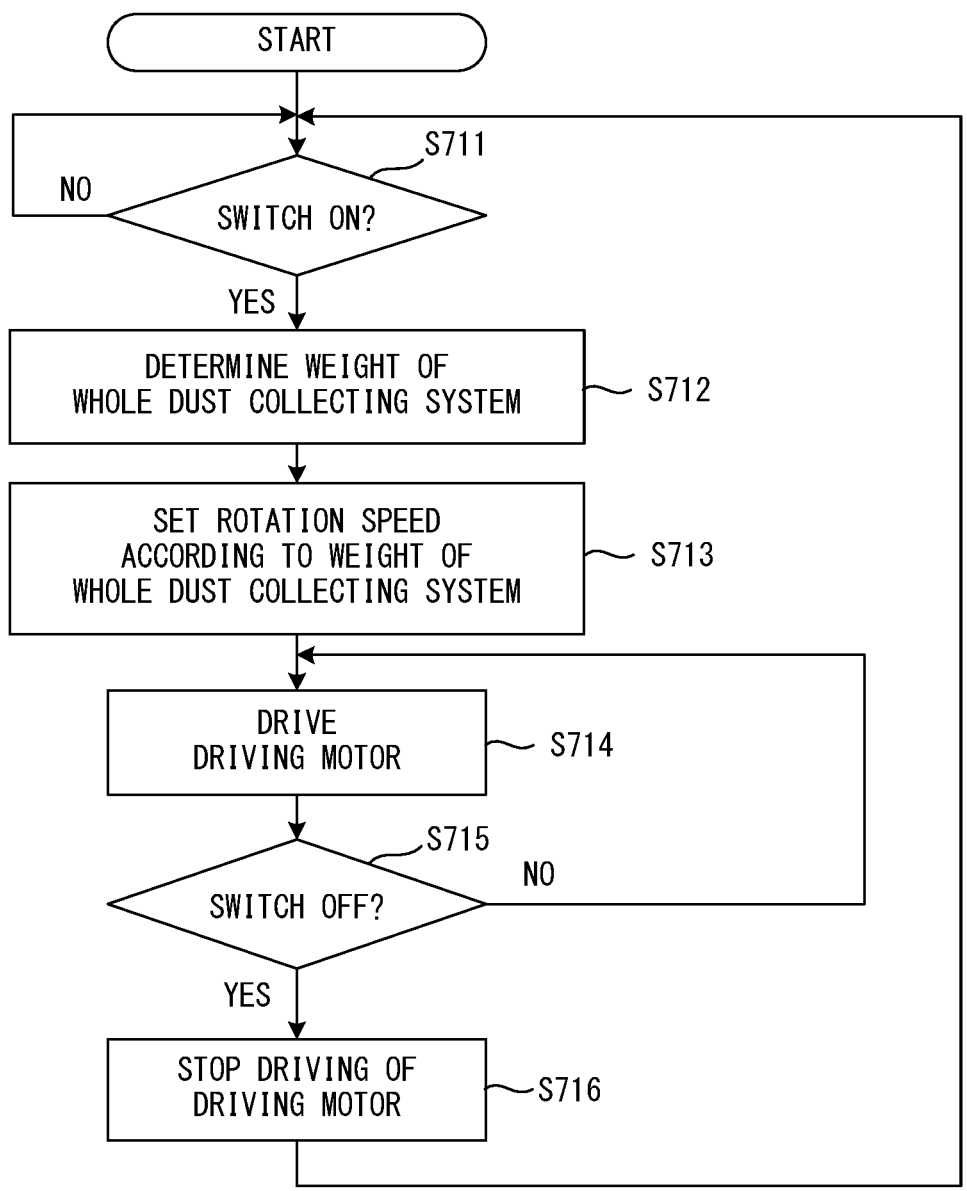
FIG. 5 is a flowchart showing drive control processing of a dust-collection motor.

As shown in FIG. 5, the control circuit 80 first monitors the trigger signal and waits until the trigger 261 is depressed and the switch 263 is turned on (S711: NO, S711). In a case where the switch 263 is turned on (S711: YES), the control circuit 80 determines the weight of the whole dust collecting system 1A based on the weight signal from the control circuit 50 of the hammer drill 2A (S712).

The control circuit 80 sets the rotation speed of the dust-collection motor 711 according to the weight of the whole dust collecting system 1A (S713). In the present embodiment, the control circuit 80 sets the rotation speed of the dust-collection motor 711 based on a predetermined correspondence between the weight of the whole dust collecting system 1A and the rotation speed of the dust-collection motor 711. Information defining the correspondence (referred to as a correspondence information) may be stored in advance, for example, in the ROM of the control circuit 80.

Figure 6:
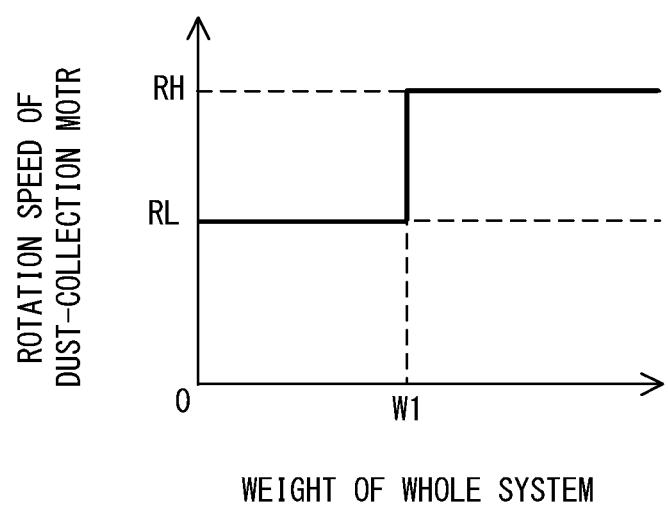
FIG. 6 is a graph schematically showing an example of a correspondence between a weight of the whole dust collecting system and a rotation speed of the dust-collection motor.

FIG. 6 schematically shows an example of the correspondence information which can be adopted in the present embodiment. In this example, it is defined that the rotation speed of the dust-collection motor 711 is set to a rotation speed RL in a case where the weight of the whole dust collecting system 1A is a specified threshold W1 or less, and that the rotation speed is changed to a rotation speed RH, which is higher than the rotation speed RL, in a case where the overall weight exceeds the threshold W1. This correspondence is defined by taking into consideration that dust generated by processing operation tends to increase when two batteries 93 but not one is used, or a heavy battery 93 with a relatively high voltage is used, in order to obtain high output. In order to prepare this correspondence information, the weight of the whole dust collecting system 1A may be determined for each combination of each of plural kinds of batteries 93 and the dust collector 7A. Then, optimal rotation speed for each combination may be determined based on actual measurements. The correspondence information shown in FIG. 6 is illustrative only and the correspondence information is not limited to this example.

As shown in FIG. 5, the control circuit 80 drives the dust-collection motor 711 at the set rotation speed (S714). In the present embodiment, the control circuit 80 drives the dust-collection motor 711 at constant rotation speed. However, like in the case of the driving motor 31, the control circuit 80 may set the rotation speed according to the operation amount of the trigger 261, using the rotation speed set with reference to the correspondence information serving as the maximum rotation speed. The control circuit 80 continues driving of the dust-collection motor 711 at the set rotation speed until the switch 263 is turned off, based on the trigger signal (S715: NO, S714). In a case where the switch 263 is turned off (S715: YES), the control circuit 80 stops driving of the dust-collection motor 711 (S716) and returns to S711.

As described above, in the present embodiment, the control circuit 50 (specifically, CPU) of the hammer drill 2 determines whether excessive rotation occurs, based on the result of comparison between the threshold and the acceleration, which corresponds to the rotation state of the body housing 21 around the driving axis A1. Further, the control circuit 50 sets the threshold according to the weight of the whole dust collecting system 1A. One or two batteries 93 and the dust collector 7A can be removably mounted to the hammer drill 2A. Therefore, the weight of the whole dust collecting system 1A may vary, depending on the number and the type of the batteries 93 to be mounted, whether the dust collector 7A is attached or not, and the type of the dust collector 7A. As described above, if the weight is different, ease of rotation of the whole dust collecting system 1A around the driving axis A1 may also be different. Particularly, in the present embodiment, the larger the overall weight, the smaller the set threshold. Therefore, the control circuit 50 of the present embodiment can appropriately determine the possibility of occurrence of excessive rotation by using the threshold set according to the weight of the whole dust collecting system 1A and stops rotational driving of the tool accessory 91 when there is such a possibility.

In the present embodiment, the control circuit 80 (specifically, CPU) of the dust collector 7A sets the rotation speed of the dust-collection motor 711 according to the weight of the whole dust collecting system 1A. As described above, if the weight of the whole dust collecting system 1A is different, the generation state of dust may be different. To cope with this, the dust collecting system 1A of the present embodiment is configured to exert appropriate dust collecting power according to the overall weight.

Second Embodiment

A dust collecting system 1A according to a second embodiment is described with reference to FIGS. 7 and 8. The dust collecting system 1A of the present embodiment has the same structure as the dust collecting system 1A (see FIGS. 1 and 2) of the first embodiment. However, in the present embodiment, processing of operation control of the dust collecting system 1A is partially different from that of the first embodiment. In the following description, structures and processings which are substantially identical to those of the first embodiment are given the same reference signs as in the first embodiment and are not described and shown or briefly described and shown as appropriate, and structures and/or processings which are different from those of the first embodiment are mainly described. This is true for subsequent embodiments described below.

In the present embodiment, the drive control processing of the driving motor 31 which is performed by the control circuit 50 (specifically, CPU) of the hammer drill 2A is basically identical to that of the first embodiment. In addition to this, the control circuit 50 outputs an acceleration signal from the acceleration sensor 631 to the control circuit 80 of the dust collector 7A via the connectors 59 and 715.

The drive control processing of the dust-collection motor 711 which is performed by the control circuit 80 (specifically, CPU) is as follows. As shown in FIG. 7, the control circuit 80 first monitors a trigger signal and waits until the trigger 261 is depressed and the switch 263 is turned on (S731: NO, S731). In a case where the switch 263 is turned on (S731: YES), the control circuit 80 determines the orientation of the dust collecting system 1A (S732). As described in the first embodiment, the acceleration sensor 631 is a triaxial acceleration sensor and thus also detects gravity acceleration. Therefore, based on the detected acceleration in three directions, the control circuit 80 can determine, for example, an inclination angle of a detection axis of the acceleration sensor 611 relative to the direction of gravity and thus an inclination angle of the driving axis A1 relative to the direction of gravity (hereinafter referred to as a body angle), as the orientation of the dust collecting system 1A relative to the direction of gravity.

The control circuit 80 sets the rotation speed of the dust-collection motor 711 according to the orientation (body angle) of the dust collecting system 1A which is determined in S732 (S733). In the present embodiment, the control circuit 80 sets the rotation speed based on a predetermined correspondence between the body angle and the rotation speed of the dust-collection motor 711. The correspondence information between the body angle and the rotation speed of the dust-collection motor 711 may be stored in advance, for example, in the ROM of the control circuit 80.

Figure 8:
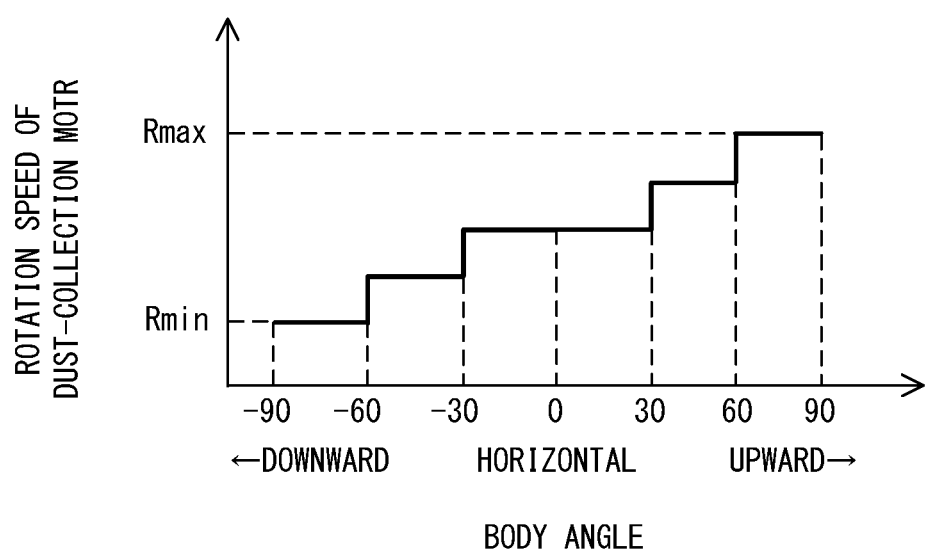
FIG. 8 is a graph schematically showing an example of a correspondence between a body angle and the rotation speed of the dust-collection motor.

FIG. 8 schematically shows an example of the correspondence information which can be adopted in the present embodiment. In this example, the body angle is defined as zero degree when the driving axis A1 extends in a horizontal direction. Further, the body angle is defined as −90 degrees when the driving axis A1 extends downward in the up-down direction (the direction of gravity), and as 90 degrees when the driving axis A1 extends upward in the up-down direction. It is further defined that the rotation speed of the dust-collection motor 711 decreases stepwise when the body angle is within a range of −30 to −90 degrees, while increasing stepwise when the body angle is within a range of 30 to 90 degrees, as compared with the rotation speed to be set when the body angle is within a range of −30 to 30 degrees. This correspondence is defined by taking into consideration that dust may fall toward a user by its own weight when processing operation is performed in an upward orientation (i.e. the tool accessory is pointed upward), while dust is likely to fall to the ground when processing operation is performed in a downward orientation (i.e. the tool accessory is pointed downward). This correspondence information may be prepared by determining an optimal rotation speed according to the orientation of the dust collecting system 1A based on actual measurements. The correspondence information shown in FIG. 8 is illustrative only and the correspondence information is not limited to this example.

Figure 7:
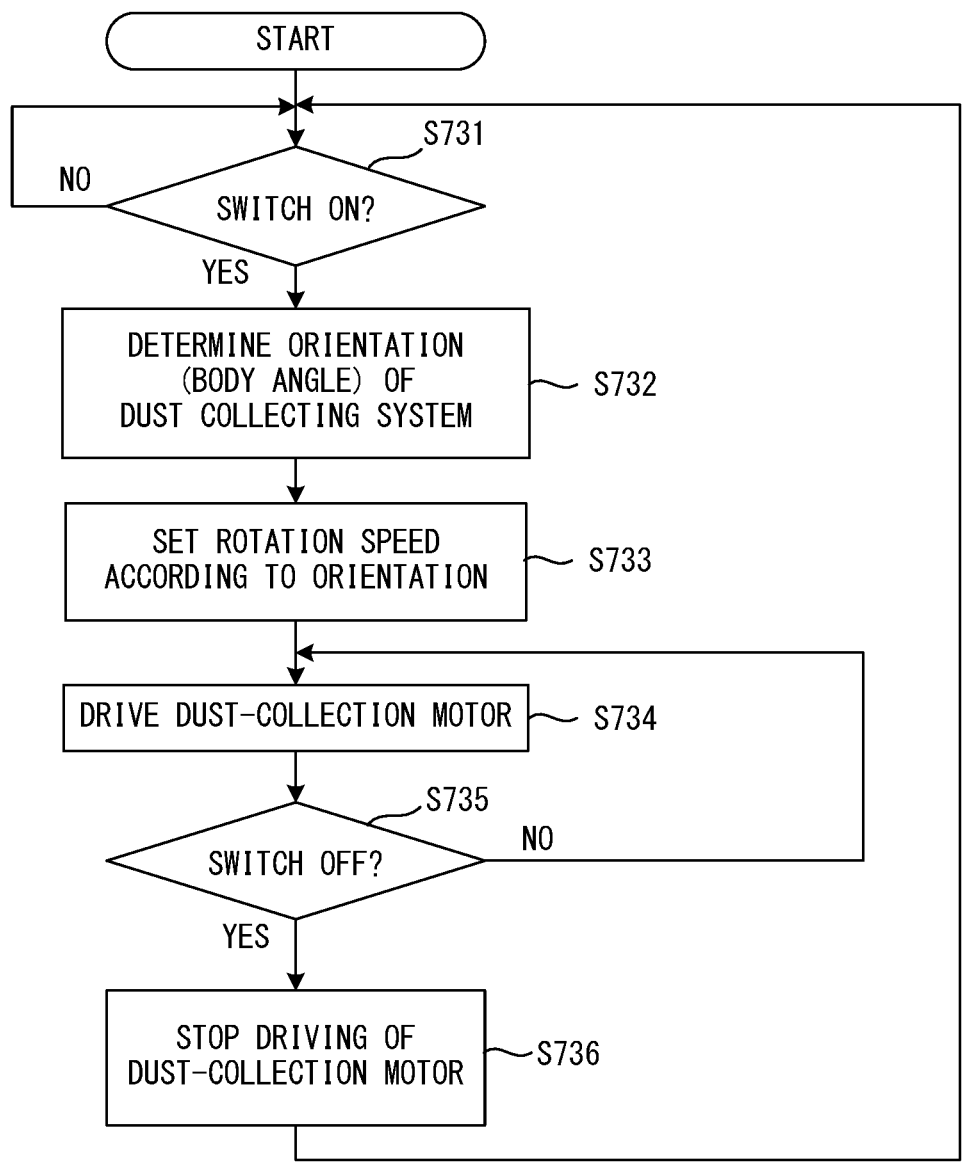
FIG. 7 is a flowchart showing drive control processing of the dust-collection motor in a second embodiment.

As shown in FIG. 7, the control circuit 80 drives the dust-collection motor 711 at the set rotation speed (S734). The control circuit 80 continues driving of the dust-collection motor 711 at the set rotation speed until the switch 263 is turned off, based on the trigger signal (S735: NO, S734). In a case where the switch 263 is turned off (S735: YES), the control circuit 80 stops driving of the dust-collection motor 711 (S736) and returns to S731.

As described above, in the dust collecting system 1A of the present embodiment, the control circuit 80 of the dust collector 7A sets the rotation speed of the dust-collection motor 711 according to the orientation (body angle) of the dust collecting system 1A. As described above, if the orientation of the dust collecting system 1A is different, the generation state of dust may be different. To cope with this, the dust collecting system 1A of the present embodiment is configured to exert appropriate dust collecting power according to the orientation.

Third Embodiment

A dust collecting system 1C according to a third embodiment is described with reference to FIGS. 9 to 11. The structure of the dust collecting system 1C of the present embodiment is partially different from that of the dust collecting system 1A (see FIGS. 1 and 2) of the first embodiment. Further, processing of operation control of the dust collecting system 1C is also partially different from that of the first embodiment.

First, the structure of the dust collecting system 1C of the present embodiment is described. The dust collecting system 1C includes a hammer drill 2C having a structure which is partially different from that of the first embodiment and the dust collector 7A (see FIGS. 1 and 2) having the same structure as that of the first embodiment.

Figure 9:
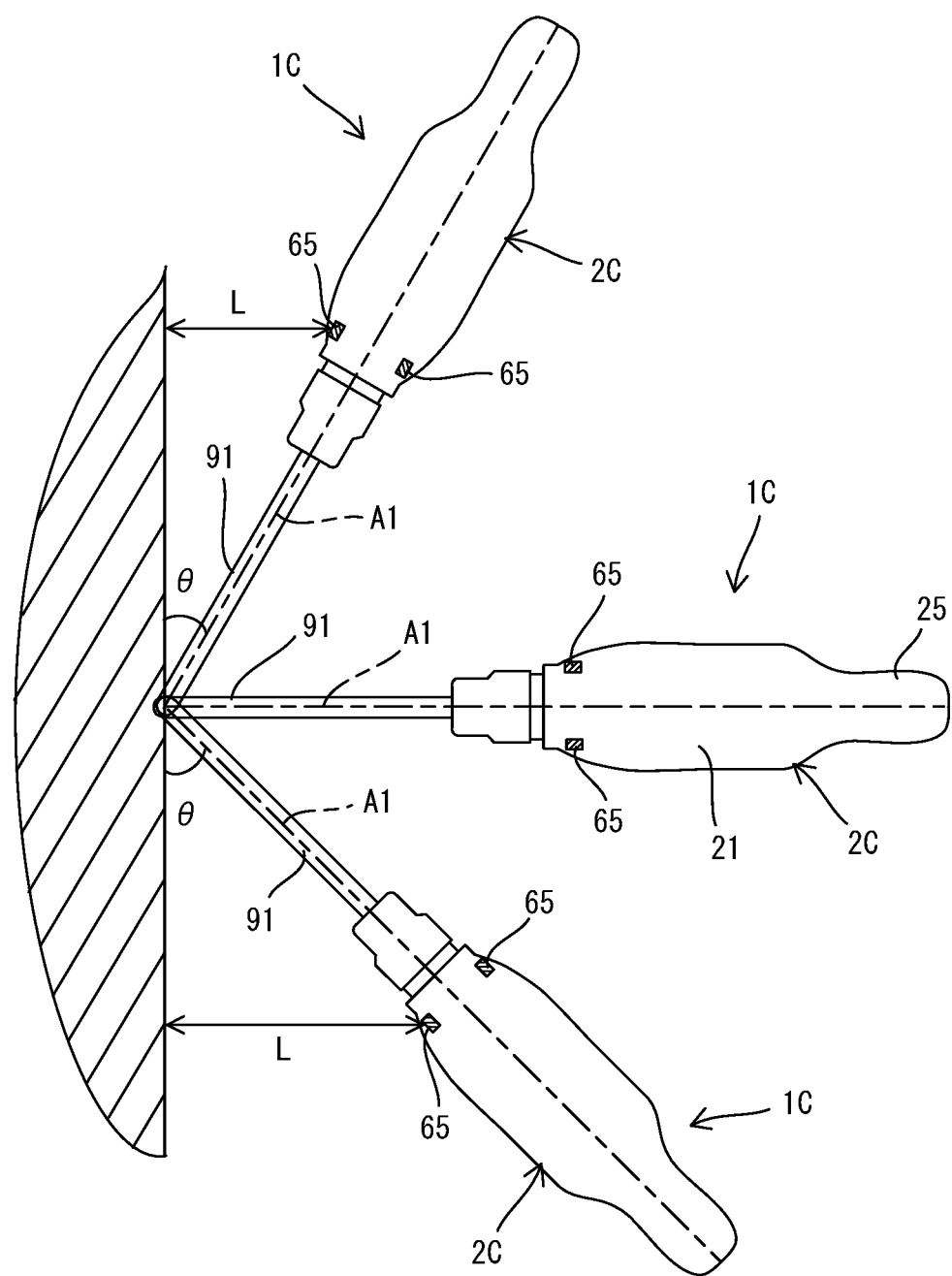
FIG. 9 is an explanatory drawing for illustrating an angle of a driving axis relative to a work face when a dust collecting system according to a third embodiment is viewed from above.
Figure 10:
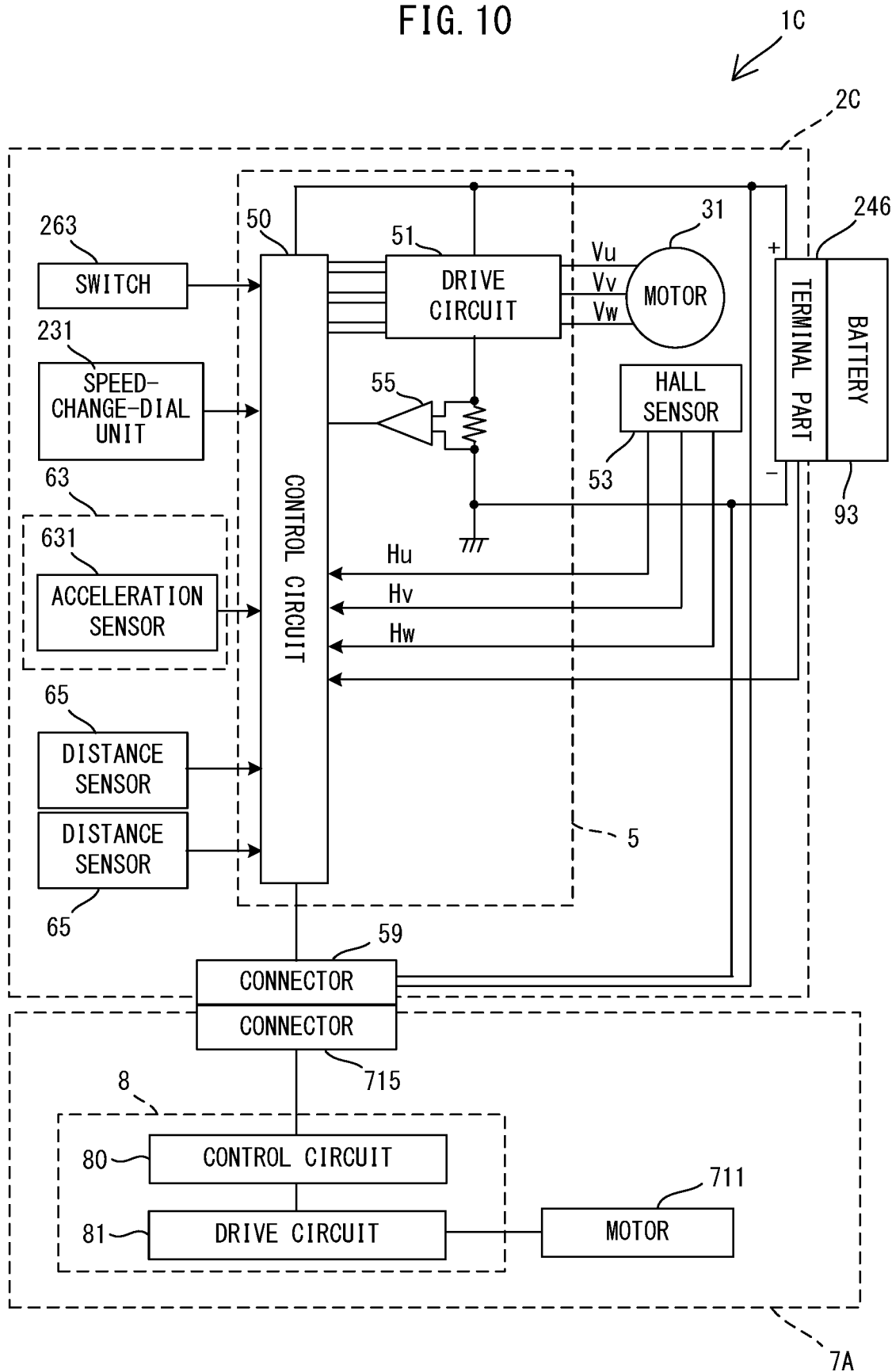
FIG. 10 is a block diagram showing the electrical configuration of the dust collecting system.
Figure 11:
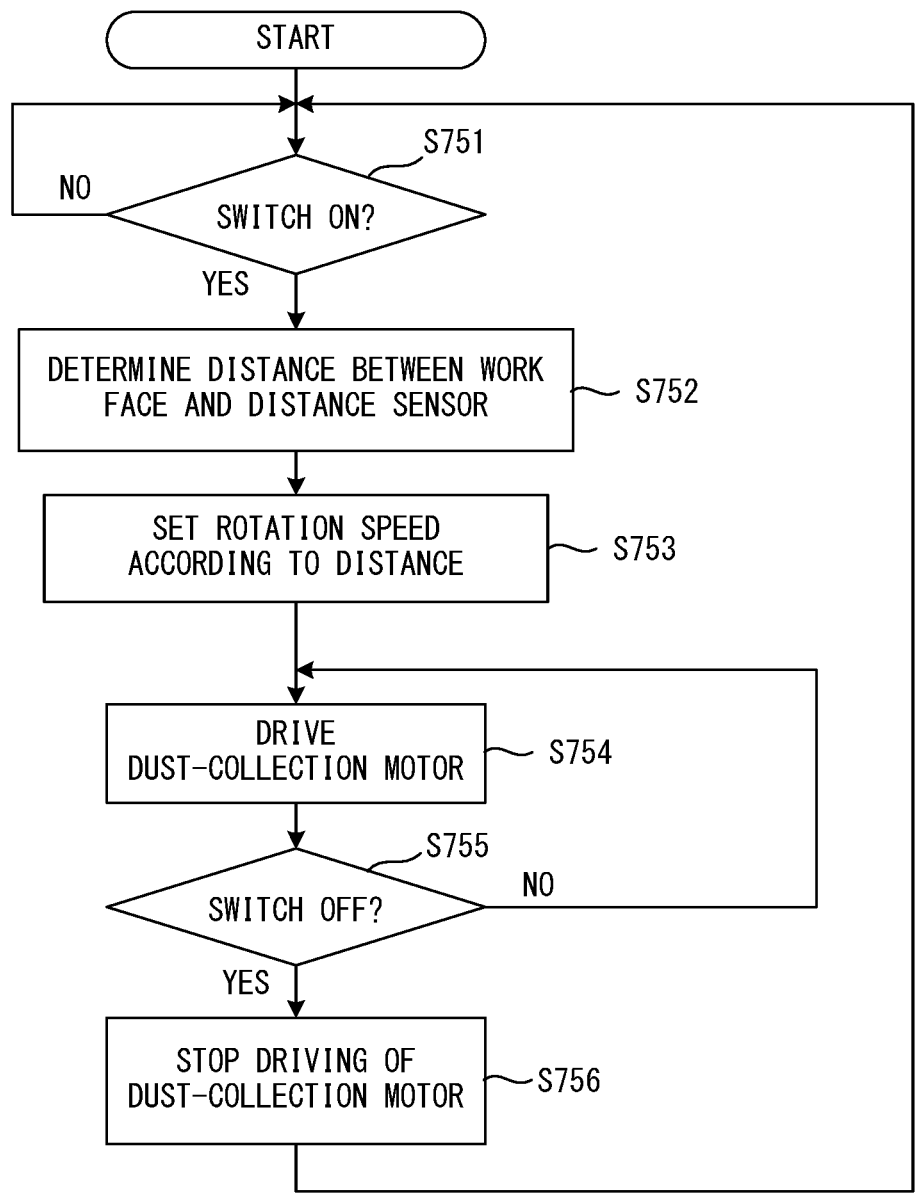
FIG. 11 is a flowchart showing drive control processing of the dust-collection motor.

Specifically, as shown in FIGS. 9 and 10, the hammer drill 2C has two distance sensors 65. It is noted that, in FIG. 9, for the sake of clarity, the dust collector 7A is not shown. In the present embodiment, a well-known infrared distance sensor is adopted as the distance sensor 65. The two distance sensors 65 are respectively provided on left and right sides of a front end portion of the body housing 21. The distance sensors 65 are configured to emit infrared light to the left and right, respectively, and detect a distance L from a work face of a workpiece to be processed, based on reflected light from the workpiece. When the tip of the tool accessory 91 is pressed against the workpiece and processing operation is performed with the driving axis A1 inclined relative to the work face of the workpiece, the distance L detected by the (left or right) distance sensor 65 (on the inclined side) corresponds to an angle θ of the driving axis A1 to the work face. Each of the distance sensors 65 is electrically connected to the control circuit 50 and configured to output to the control circuit 50 a signal corresponding to the detected distance L (angle θ) (hereinafter referred to as a distance signal).

Next, operation control of the dust collecting system 1C in the present embodiment is described.

In the present embodiment, drive control processing of the driving motor 31 which is performed by the control circuit 50 (specifically, CPU) of the hammer drill 2C is basically identical to that of the first embodiment. In addition to this, the control circuit 50 outputs a distance signal from the distance sensor 65 to the control circuit 80 of the dust collector 7A via the connectors 59 and 715.

The drive control processing of the dust-collection motor 711 which is performed by the control circuit 80 (specifically, CPU) is as follows. As shown in FIG. 11, the control circuit 80 first monitors a trigger signal and waits until the trigger 261 is depressed and the switch 263 is turned on (S751: NO, S751). In a case where the switch 263 is turned on (S751: YES), the control circuit 80 determines the distance L between the distance sensor 65 and the work face based on the distance signal (S752).

The control circuit 80 sets the rotation speed of the dust-collection motor 711 according to the determined distance L (S753). In the present embodiment, the control circuit 80 sets the rotation speed based on a predetermined correspondence between the distance L and the rotation speed of the dust-collection motor 711 (in other words, correspondence between the angle θ and the rotation speed of the dust-collection motor 711). The correspondence information between the distance L and the rotation speed of the dust-collection motor 711 may be stored in advance, for example, in the ROM of the control circuit 80. Although not shown in detail, in the present embodiment, it is defined that the rotation speed of the dust-collection motor 711 is set to the rotation speed RL in a case where the distance L is a specified threshold or more, and the rotation speed is set to the rotation speed RH, which is higher than the rotation speed RL, in a case where the distance L is less than the specified threshold. This correspondence is defined by taking into consideration that dust generated by processing operation (particularly, chipping operation) of the tool accessory 91 tends to increase when the distance L is relatively short, that is, when the angle θ is relatively small in the processing operation. This correspondence information may be prepared by determining an optimal rotation speed according to the distance L (angle θ) based on actual measurements.

The control circuit 80 drives the dust-collection motor 711 at the set rotation speed (S754). The control circuit 80 continues driving of the dust-collection motor 711 at the set rotation speed until the switch 263 is turned off, based on the trigger signal (S755: NO, S754). In a case where the switch 263 is turned off (S755: YES), the control circuit 80 stops driving of the dust-collection motor 711 (S756) and returns to S751.

As described above, in the dust collecting system 1C of the present embodiment, the control circuit 80 of the dust collector 7A sets the rotation speed of the dust-collection motor 711 according to the angle θ of the driving axis A1 relative to the work face of the workpiece. As described above, if the angle of the driving axis A1, that is, the angle of the tool accessory 91 relative to the work face changes during processing operation (particularly, chipping operation), the generation state of dust may change. To cope with this, the dust collecting system 1C of the present embodiment is configured to exert appropriate dust collecting power according to the angle of the tool accessory 91. As an alternative to the above-described example, the rotation speed of the dust-collection motor 711 may be set so as to change proportionally (linearly), in a quadric curve (non-linearly) or in a stepwise manner according to the distance L.

Fourth Embodiment

Figure 13:
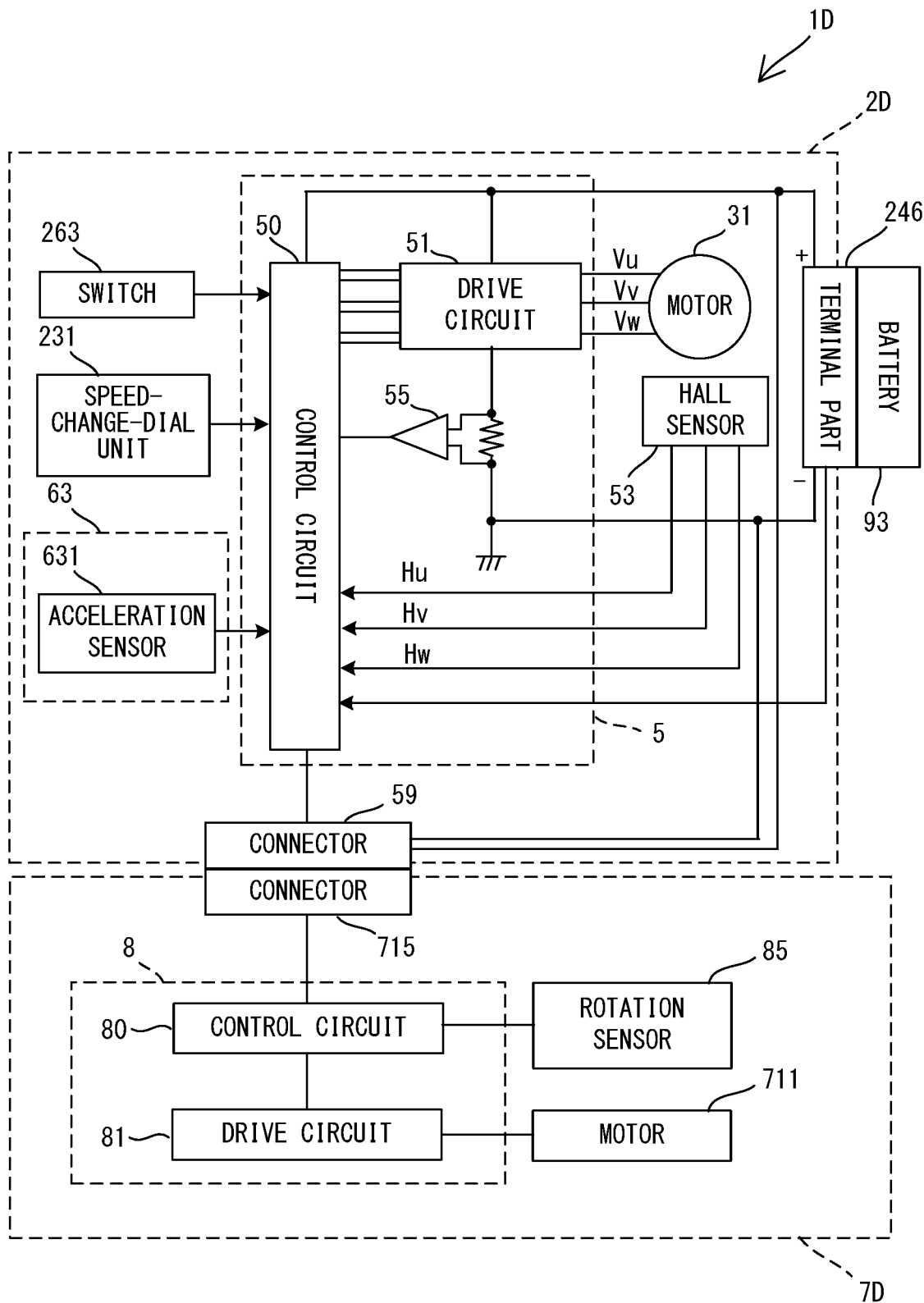
FIG. 13 is a block diagram showing the electrical configuration of the dust collecting system.
Figure 14:
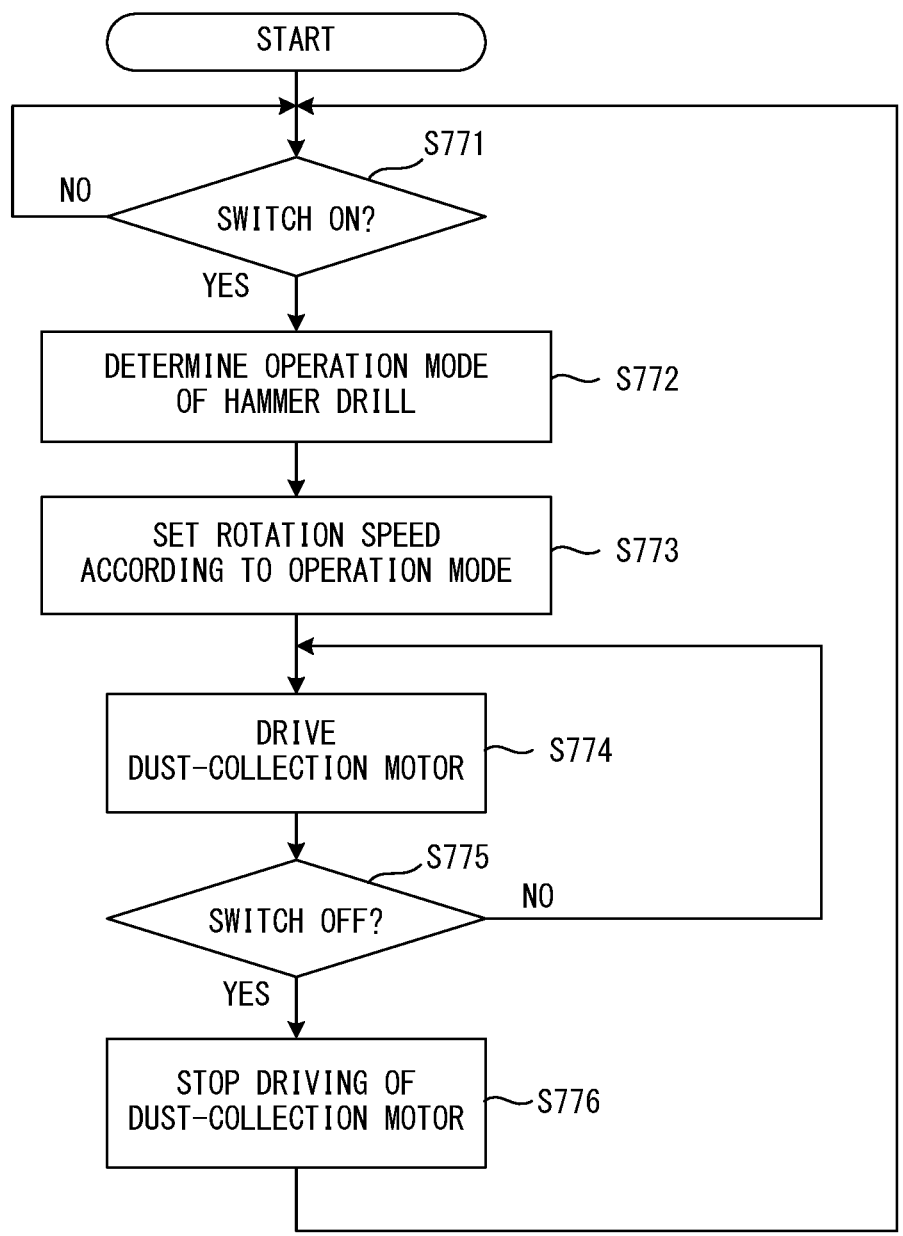
FIG. 14 is a flowchart showing drive control processing of the dust-collection motor.

A dust collecting system 1D according to a fourth embodiment is described with reference to FIGS. 12 to 14. The structure of the dust collecting system 1D of the present embodiment is partially different from that of the dust collecting system 1A (see FIGS. 1 and 2) of the first embodiment. Further, processing of operation control of the dust collecting system 1D is also partially different from that of the first embodiment.

First, the structure of the dust collecting system 1D of the present embodiment is described. The dust collecting system 1D includes a hammer drill 2D and a dust collector 7D of which structures are both partially different from those of the first embodiment.

Figure 12:
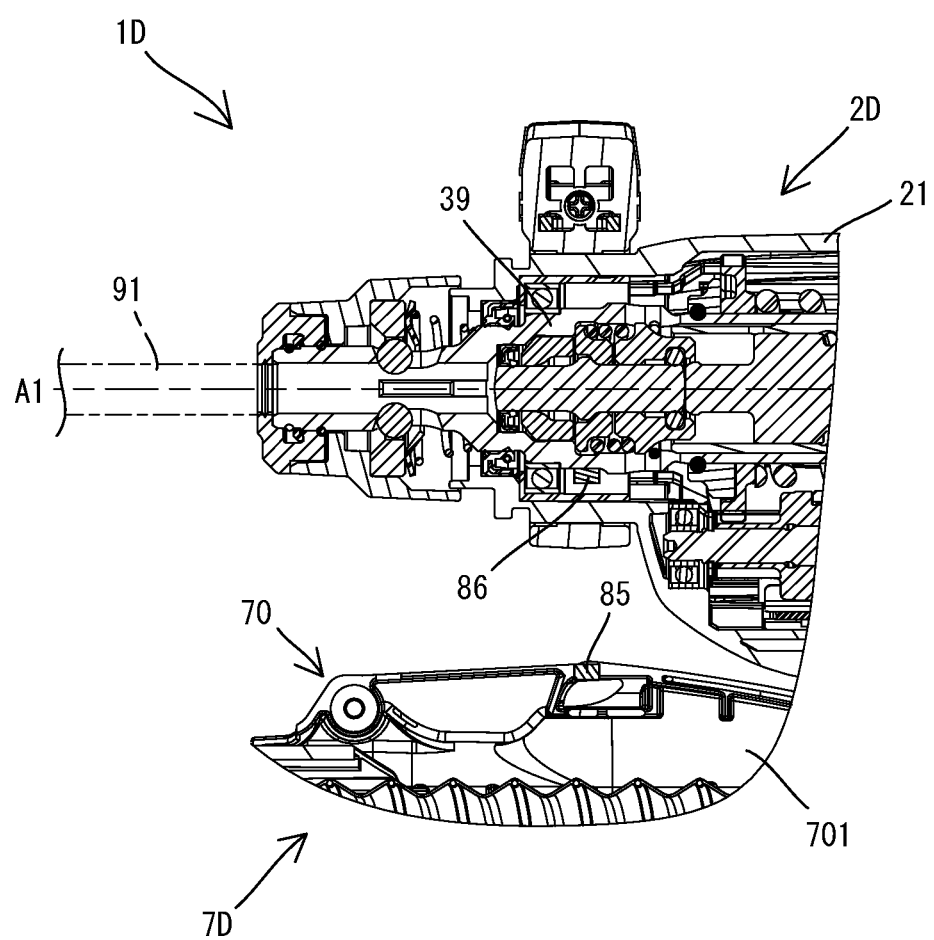
FIG. 12 is a sectional partial view showing a dust collecting system according to a fourth embodiment.

Specifically, as shown in FIG. 12, the hammer drill 2D has a magnet 86 fixed onto an outer periphery of the tool holder 39. The tool holder 39 is rotationally driven by the rotation-transmitting mechanism of the driving mechanism 35 when an operation mode involving the drilling motion, that is, either one of the hammer drill mode and the drill mode, is selected via the mode-switching dial (not shown). At this time, the magnet 86 rotates together with the tool holder 39. The dust collector 7D has a rotation sensor 85 disposed in an upper end portion of the body housing 70 (specifically, the sliding-guide part 701). More specifically, the rotation sensor 85 is disposed in the same position as the magnet 86 in the front-rear direction. The rotation sensor 85 is a sensor having a Hall element and is configured to detect the magnet 86 when the magnet 86 is located within a specified detection range.

In the present embodiment, the rotation sensor 85 is configured to detect the magnet 86 when the magnet 86 is located right below the driving axis A1. Therefore, when the tool holder 39 is not rotationally driven (that is, when the whole driving mechanism 35 or the rotation-transmitting mechanism is not driven), either a state in which the rotation sensor 85 does not detect the magnet 86 or a state in which the rotation sensor 85 detects the magnet 86 is continued. On the other hand, when the tool holder 39 is rotationally driven (that is, when the rotation-transmitting mechanism is driven), the state in which the rotation sensor 85 does not detect the magnet 86 and the state in which the rotation sensor 85 detects the magnet 86 are alternately repeated. In this manner, the rotation sensor 85 can detect rotation of the tool holder 39. As shown in FIG. 13, the rotation sensor 85 is electrically connected to the control circuit 80 and configured to output a signal indicating the detection results (hereinafter referred to as a rotation signal) to the control circuit 80.

Next, operation control of the dust collecting system 1D in the present embodiment is described.

In the present embodiment, drive control processing of the driving motor 31 which is performed by the control circuit 50 (specifically, CPU) of the hammer drill 2D is basically identical to that of the first embodiment.

The drive control processing of the dust-collection motor 711 which is performed by the control circuit 80 (specifically, CPU) of the dust collector 7D is as follows. As shown in FIG. 14, the control circuit 80 first monitors a trigger signal and waits until the trigger 261 is depressed and the switch 263 is turned on (S771: NO, S771). In a case where the switch 263 is turned on (S771: YES), the control circuit 80 determines whether the driving mechanism 35 is operated in an operation mode (hammer drill mode or drill mode) which involves the drilling motion (rotational driving of the tool holder 39) or an operation mode (hammer mode) which involves only the hammering motion, based on the rotation signal from the rotation sensor 85 (S772).

The control circuit 80 sets the rotation speed of the dust-collection motor 711 according to the determined operation mode (S773). In the present embodiment, the control circuit 80 sets the rotation speed based on a predetermined correspondence between the operation mode and the rotation speed of the dust-collection motor 711. The correspondence information between the operation mode and the rotation speed of the dust-collection motor 711 may be stored in advance, for example, in the ROM of the control circuit 80. Although not shown in detail, in the present embodiment, it is defined that the rotation speed of the dust-collection motor 711 is set to the rotation speed RH in a case where the operation mode is the hammer drill mode or the drill mode, and that the rotation speed is set to the rotation speed RL, which is lower than the rotation speed RH, in a case where the operation mode is the hammer mode. This correspondence is defined by taking into consideration that finer dust tends to scatter around in the drilling operation in the hammer drill mode or the drill mode than in the chipping operation in the hammer mode. This correspondence information may be prepared by determining an optimal rotation speed for the hammer drill mode and the drill mode and an optimal rotation speed for the hammer mode, based on actual measurements.

The control circuit 80 drives the dust-collection motor 711 at the set rotation speed (S774). The control circuit 80 continues driving of the dust-collection motor 711 at the set rotation speed until the switch 263 is turned off, based on the trigger signal (S775: NO, S774). In a case where the switch 263 is turned off (S775: YES), the control circuit 80 stops driving of the dust-collection motor 711 (S776) and returns to S771.

As described above, in the dust collecting system 1D of the present embodiment, the dust collector 7D is provided with the rotation sensor 85 capable of detecting rotation of the tool holder 39. The control circuit 80 determines the operation mode of the hammer drill 2D based on the detection result of the rotation sensor 85 and sets the rotation speed of the dust-collection motor 711 according to the operation mode. As described above, the generation state of dust may also differ between when the drilling motion is performed and when only the hammering motion is performed. To cope with this, the dust collecting system 1D of the present embodiment is configured to exert appropriate dust collecting power according to the operation mode. Further, in the present embodiment, the rotation sensor 85 and the control circuit 80 are both provided in the dust collector 7D. As a result, the control circuit 80 need not perform communication relating to the rotation signal with the control circuit 50 of the hammer drill 2D, thus providing excellent processing efficiency.

The magnet 86 and the rotation sensor 85 may be disposed in positions different from those in the example of FIG. 12. In this case, the magnet 86 may be disposed on a component of the driving mechanism 35 which rotates around the driving axis A1 in the operation mode involving the drilling motion. In addition, the rotation sensor 85 may be provided in a position where the rotation sensor 85 can detect the magnet 86.

Figure 15:
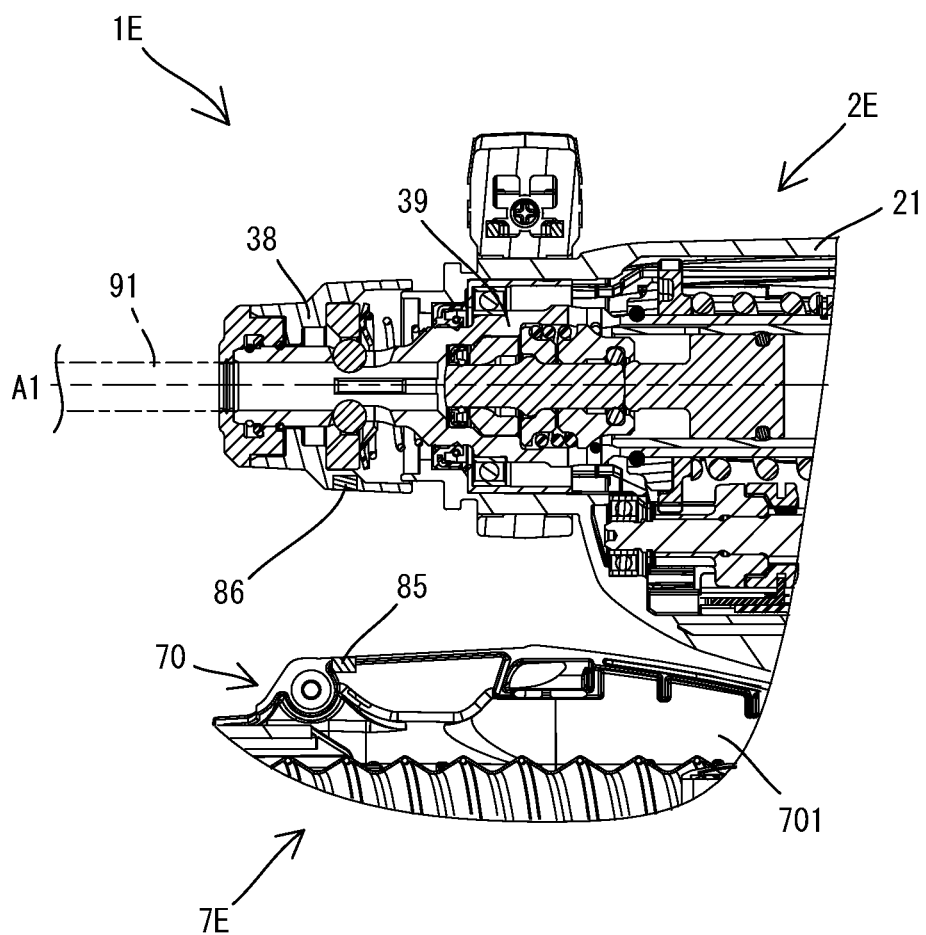
FIG. 15 is a sectional partial view showing a dust collecting system according to a modified example of the fourth embodiment.

For example, like in a dust collecting system 1E shown in FIG. 15, the magnet 86 may be disposed on an outer periphery of a chuck 38 of a hammer drill 2E. The chuck 38 is mounted onto the tool holder 39 and rotates together with the tool holder 39. The rotation sensor 85 may be disposed in an upper end portion of the body housing 70 of a dust collector 7E and may be configured to detect rotation of the chuck 38 and output a rotation signal to the control circuit 80.

Figure 16:
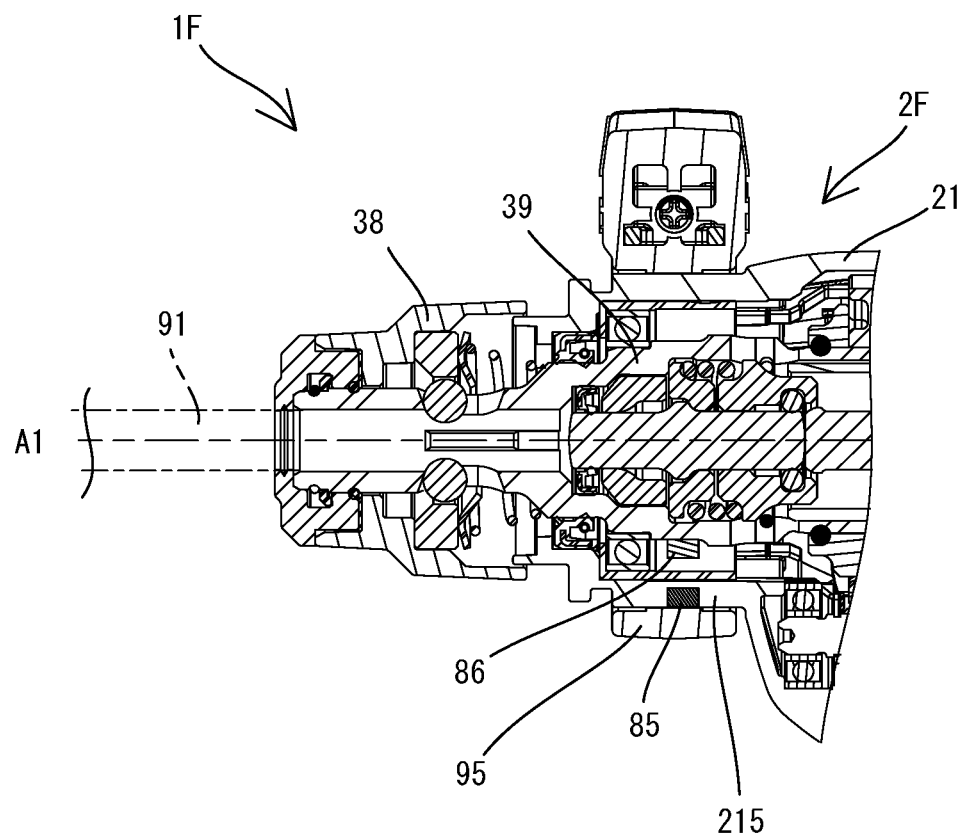
FIG. 16 is a sectional partial view showing a dust collecting system according to another modified example of the fourth embodiment.

Further, for example, like in a dust collecting system 1F shown in FIG. 16, a rotation sensor 85 may be provided in a hammer drill 2F. In this case, the rotation sensor 85 may be disposed outside a region where lubricant is sealed, in the body housing 21. In the example of FIG. 16, the rotation sensor 85 is disposed on a barrel 215 of the hammer drill 2F. The barrel 215 is a cylindrical portion forming a front end portion of the body housing 21 and configured such that an auxiliary handle 95 (only partially shown) is removably mounted thereon. Although not shown, the rotation sensor 85 is electrically connected to the control circuit 50 and outputs the rotation signal to the control circuit 50. The control circuit 50 may further output this rotation signal to the control circuit 80.

In the modifications shown in FIGS. 15 and 16, like in the fourth embodiment, the control circuit 80 drives the dust-collection motor 711 at appropriate rotation speed according to the operation mode of the hammer drill 2E, 2F.

Correspondences between the features of the above-described embodiments and the features of the invention are as follows. It is noted, however, that the features of the above-described embodiment are mere examples which are non-limiting. Each of the dust collecting systems 1A, 1C, 1D, 1E, and 1F is an example of the "dust collecting system". Each of the hammer drills 2A, 2C, 2D, 2E, and 2F is an example of the "power tool". The tool accessory 91 is an example of the "tool accessory". Each of the dust collectors 7A, 7D, and 7E is an example of the "dust collector". The battery-mounting part 245, the driving motor 31, the driving mechanism 35 and the body housing 21 are examples of the "battery-mounting part", the "first motor", the "driving mechanism" and the "body housing", respectively. The control circuit 50 and the control circuit 80 are an example that corresponds to the "control device". The acceleration sensor 631 is an example of the "first detecting device". The dust-collection motor 711 and the fan 713 are examples of the "second motor" and the "fan", respectively. Each of the the tool holder 39 and the chuck 38 is an example that corresponds to the "rotating member". The rotation sensor 85 is an example of the "second detecting device". The control circuits 50 and 80 are examples of the "first control device" and the "second control device", respectively.

The above-described embodiments are mere examples, and the dust collecting system according to the present invention is not limited to the structures and the processings of the dust collecting systems 1A, 1C, 1D, 1E, and 1F (hereinafter simply referred to as the dust collecting system 1A and the like) of the above-described embodiments. For example, the structures and the processings of the first to fourth embodiments may be adopted in combination with one or more of the structures and the processings of any one or more of the other embodiments. Further, part of the structures and the processings of the first to fourth embodiments may be appropriately omitted.

Some other adoptable modifications are now described. One or more of these modifications may be adopted in combination with the dust collecting system 1A and the like of the above-described embodiments or the claimed invention.

In the above-described embodiments, the hammer drills 2A, 2C, 2D, 2E, and 2F (hereinafter simply referred to as the hammer drill 2A and the like) are each described as an example of the power tool which is configured to perform processing operation by driving a tool accessory. However, the power tool which can be adopted in the dust collecting system 1A and the like is not limited to the hammer drill 2A and the like, and any power tool (typically, a drilling tool and an impact tool) may be adopted which is used for processing operation (such as drilling and chipping) by which dust may be generated. For example, an electric hammer, a vibration drill and an electric drill may be adopted in place of the hammer drill 2A and the like. Further, a hammer drill having only the hammer drill mode and the hammer mode may be adopted.

In the above-described embodiments, the control circuit 50 of the hammer drill 2A and the like and the control circuit 80 of the dust collectors 7A, 7D, and 7E (hereinafter simply referred to as the dust collector 7A and the like) respectively control driving of the driving motor 31 and the dust-collection motor 711, independently from each other. However, for example, the control circuit 50 may perform both of the above-described drive control processings of the driving motor 31 and the dust-collection motor 711. Further, the above-described drive control processings of the driving motor 31 and the dust-collection motor 711 may be distributed to a plurality of control circuits. In the above-described embodiments, the control circuits 50 and 80 are each formed by a microcomputer including a CPU, but may be formed, for example, by a programmable logic device such as an ASIC (Application Specific Integrated Circuit) and an FPGA (Field Programmable Gate Array).

In the first embodiment, acceleration is used to determine whether excessive rotation occurs (the possibility of occurrence of kickback) due to occurrence of the locked state of the tool accessory 91. However, the method of determination as to the excessive rotation is not limited to this example. For example, the speed, angular speed or angular acceleration of the body housing 21 may be adopted as an index value corresponding to the rotation state of the body housing 21 around the driving axis A1, and its corresponding threshold may be appropriately set. Further, an index value (such as the load current of the driving motor 31 and the temperature change of the battery 93) corresponding to the load on the tool accessory 91 may be used in place of or in addition to acceleration and other similar index values, and its corresponding threshold may be appropriately set.

In the fourth embodiment and its modifications, the rotation sensor 85 of a magnetic-field-detection type is provided to determine the operation mode of the hammer drills 2D, 2E, and 2F. In place of the rotation sensor 85, for example, an optical sensor may be adopted. Further, a method other than detecting rotation of the tool holder 39 or the chuck 38 may be adopted to determine the operation mode. For example, a detecting device of a contact type or non-contact type may be adopted which is configured to output different signals according to the switching position (specifically, a position for the selected operation mode) of the mode-switching dial (not shown).

The structures of the body housing 21 and the handle 25 of the hammer drill 2A and the like and a connecting structure therefor, and the internal structures (including the driving motor 31, the driving mechanism 35 and the controller 5) of the hammer drill 2A and the like and their arrangement may be appropriately changed. For example, the driving motor 31 may be a motor with a brush. As the driving mechanism 35, a motion-converting mechanism with a crank mechanism may be adopted, in place of the motion-converting mechanism with the swinging member.

The battery-mounting part 245 may be provided in the body housing 21 instead of being provided in the handle 25. Further, the number of the battery-mounting parts 245 (in other words, the number of the batteries 93 which can be mounted) is not limited to two, and one or three or more battery-mounting parts 245 may be provided.

The structure of the dust collector 7A and the like may also be appropriately changed. For example, the shapes and arrangement of the body housing 70, the sliding part 75 and the dust-transfer passage 77, the attaching/detaching structure of the dust collector 7A and the like relative to the hammer drill 2A and the like, and the structures of the dust-collection motor 711 and the fan 713 may be appropriately changed. For example, the dust-collection motor 711 may be a brushless motor. Further, in a structure in which the control circuit 50 of the hammer drill 2A and the like controls driving of the driving motor 31 and the dust-collection motor 711 as described above, the controller 8 may have only the drive circuit 81 without having the control circuit 80.

In the above-described embodiments, the dust collector 7A and the like house the fan 713 for generating air flow for collecting dust and the dust-collection motor 711 configured to rotationally drive the fan 713. However, the dust collector 7A and the like may not have the fan 713 and the dust-collection motor 711. In this case, a dust-collection fan may be provided in the hammer drill 2A and the like or other power tools to which the dust collector 7A and the like can be attached, and configured to be rotationally driven by the driving motor 31 (see, for example, JP 2017-221986A). In this case, for example, in S216 of the drive control processing shown in FIG. 3, the control circuit 50 may drive the driving motor 31 at rotation speed set according to the weight of the whole dust collecting system 1A and the like which is determined in S215.

As for a power tool to which plural kinds of batteries and dust collectors having different weights can be removably mounted, Aspect 1 is provided for the purpose of improving in control of the power tool with the battery and/or the dust collector mounted thereto. Aspect 1 may be adopted independently or in combination with one or more of the above-described embodiments and their modifications, and the claimed invention.

(Aspect 1)

A power tool configured to perform processing operation on a workpiece by driving a tool accessory, the power tool comprising:

at least one battery-mounting part each configured to removably receive a battery;

a first motor configured to be operated by power supplied from the battery;

a driving mechanism configured to drive the tool accessory by power of the first motor;

a body housing that houses the first motor and the driving mechanism and is configured such that a dust collector configured to collect dust generated by the processing operation is selectively mounted thereto; and a control device configured to control operation of the power tool according to a weight of at least one battery and/or the dust collector which is mounted to the power tool.

DESCRIPTION OF THE NUMERALS 1A, 1C, 1D, 1E, 1F: dust collecting system, 2A, 2C, 2D, 2E, 2F: hammer drill, 21: body housing, 215: barrel, 22: driving-mechanism-housing part, 23: motor-housing part, 231: speed-change-dial unit, 24: controller-housing part, 245: battery-mounting part, 246: terminal part, 25: handle, 26: grip part, 261: trigger, 263: switch, 28: upper connection part, 281: elastic member, 29: lower connection part, 291: support shaft, 31: driving motor, 311: motor shaft, 35: driving mechanism, 38: chuck, 39: tool holder, 5: controller, 50: control circuit, 51: drive circuit, 53: Hall sensor, 55: current-detecting amplifier, 59: connector, 63: acceleration sensor unit, 631: acceleration sensor, 65: distance sensor, 7A, 7D, 7E: dust collector, 70: body housing, 701: sliding-guide part, 703: connector part, 705: motor-housing part, 711: dust-collection motor, 713: fan, 715: connector, 73: dust case, 735: filter, 75: sliding part, 751: first tubular part, 752: second tubular part, 753: cover part, 754: suction port, 77: dust-transfer passage, 771: hose, 772: spring, 775: hose-connecting part, 8: controller, 80: control circuit, 81: drive circuit, 85: rotation sensor, 86: magnet, 91: tool accessory, 93: battery, 95: auxiliary handle, A1: driving axis

What is claimed is:

1. A dust collecting system including a power tool configured to perform processing operation on a workpiece by driving a tool accessory and a dust collector configured to be removably attached to the power tool and to collect dust generated by the processing operation, wherein:
    the power tool comprises:
        at least one battery- mounting part configured to removably receive a battery;
        a first motor configured to operate with electric power supplied from the battery;
        a driving mechanism configured to drive the tool accessory by power of the first motor; and
        a body housing that houses the first motor and the driving mechanism;
    the dust collecting system comprises a control device configured to control operation of at least one of the power tool and the dust collector according to a state of the dust collecting system;
    the driving mechanism is configured to perform at least drilling motion of rotationally driving the tool accessory around a driving axis;
    the control device is configured to stop rotational driving of the tool accessory in response to determining the excessive rotation of the body housing around the driving axis occurs, in accordance with specified criteria;
    the control device is configured to set the specified criteria according to a weight of the whole dust collecting system;
    the body housing is configured to receive selected one of plural types of dust collectors; and
    the control device is configured to determine a type of the dust collector attached to the power tool and determine the weight of the dust collecting system based on the type of the dust collector.

2. The dust collecting system as defined in claim 1, wherein:
    the power tool further includes a first detecting device configured to detect an index value corresponding to a rotation state of the body housing around the driving axis,
    the control device is configured to determine whether or not the excessive rotation occurs based on a result of comparison between the index value and a reference value, and
    the control device is configured to set the reference value according to the weight of the dust collecting system.

3. The dust collecting system as defined in claim 2, wherein:
    the first detecting device is configured to detect any one of speed, acceleration, angular speed and angular acceleration as the index value, and
    the control device is configured to change the reference value to a lower value as the weight of the dust collecting system increases.

4. The dust collecting system as defined in claim 1, wherein:
    the at least one battery-mounting part is configured to receive selected one of plural types of batteries, and
    the control device is configured to determine a type of the battery mounted to each of the at least one battery-mounting part and determine the weight of the dust collecting system based on the type of the battery.

5. The dust collecting system as defined in claim 1, wherein:
    the at least one battery-mounting part includes a plurality of battery-mounting parts, each of the plurality of battery-mounting parts is configured to removably receive a battery, and
    the control device is configured to determine a number of batteries mounted to the plurality of battery-mounting parts and to determine the weight of the dust collecting system based on the number of batteries.

6. The dust collecting system as defined in claim 1, wherein:
    the body housing includes a first connector,
    the dust collector includes a second connector configured to be connected to the first connector when the dust collector is attached to the body housing, and
    the control device is in the power tool and configured to determine the type of the dust collector when the first connector is connected to the second connector.

7. A dust collecting system including a power tool configured to perform processing operation on a workpiece by driving a tool accessory and a dust collector configured to be removably attached to the power tool and to collect dust generated by the processing operation, wherein:
    the power tool comprises:
        at least one battery- mounting part configured to removably receive a battery;
        a first motor configured to operate with electric power supplied from the battery;
        a driving mechanism configured to drive the tool accessory by power of the first motor; and
        a body housing that houses the first motor and the driving mechanism,
    the dust collecting system comprises a control device configured to control operation of at least one of the power tool and the dust collector according to a state of the dust collecting system,
    the dust collector comprises:
        a second motor; and
        a fan configured to be rotationally driven by the second motor to generate air flow for collecting dust, and the control device is configured to set a rotation speed of the second motor according to an orientation of the dust collecting system.

\* \* \* \* \*